(12) United States Patent
Gil et al.

(10) Patent No.: US 11,741,422 B2
(45) Date of Patent: Aug. 29, 2023

(54) SYSTEMS, METHODS, AND APPARATUSES FOR SHIFTING AND STAGING STORAGE STRUCTURES AND PARCELS THEREON

(71) Applicant: United Parcel Service of America, Inc., Atlanta, GA (US)

(72) Inventors: Julio Gil, Veldhoven (NL); Mallory Freeman, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 780 days.

(21) Appl. No.: 16/557,573

(22) Filed: Aug. 30, 2019

(65) Prior Publication Data
US 2020/0074404 A1 Mar. 5, 2020

Related U.S. Application Data

(60) Provisional application No. 62/725,577, filed on Aug. 31, 2018.

(51) Int. Cl.
*G06Q 10/08* (2023.01)
*B64C 39/02* (2023.01)
(Continued)

(52) U.S. Cl.
CPC ..... *G06Q 10/08355* (2013.01); *B64C 39/024* (2013.01); *B64D 1/12* (2013.01);
(Continued)

(58) Field of Classification Search
CPC ............ G06Q 10/08355; B64C 39/024; B64C 2201/128; B64D 1/12; G05D 1/0011;
(Continued)

(56) References Cited

U.S. PATENT DOCUMENTS 6,622,846 B1 9/2003 Dean
9,002,506 B1 * 4/2015 Agarwal .............. G06Q 10/087
700/218
(Continued)

FOREIGN PATENT DOCUMENTS

CN 107696944 A 2/2018
CN 108032782 A * 5/2018 ................ B60P 1/00
(Continued)

OTHER PUBLICATIONS

International Search Report and Written Opinion received for PCT Patent Application No. PCT/US2019/049191, dated Jan. 16, 2020, 14 pages.

*Primary Examiner* — Brian P Sweeney
(74) *Attorney, Agent, or Firm* — Shook, Hardy & Bacon L.L.P.

(57) ABSTRACT

Systems, methods, and apparatuses for selectively shifting and staging storage structures in a storage space are provided. Systems, methods, and apparatuses for dynamically organizing packages based on a travel route are also provided. In embodiments, a plurality of parcels may be stored on storage structures located within a vehicle and each storage structure may be provided in a modular assembly. During a delivery operation, the system may determine which parcels are next to be delivered and, either based on predetermined information or dynamic information, may adjust the position of the storage structures within the vehicle using shifting mechanisms and control systems coupled thereto to present the appropriate parcel for retrieval from the vehicle.

9 Claims, 31 Drawing Sheets

(51) Int. Cl.
*B64D 1/12* (2006.01)
*G05D 1/00* (2006.01)
*G08G 5/00* (2006.01)
*G06Q 10/0835* (2023.01)
*B64U 101/60* (2023.01)

(52) U.S. Cl.
CPC ......... *G05D 1/0011* (2013.01); *G08G 5/0069* (2013.01); *B64U 2101/60* (2023.01)

(58) Field of Classification Search
CPC ....... G08G 5/0069; B60P 3/34; B65G 1/0478; B65G 1/133
See application file for complete search history.

(56) References Cited

U.S. PATENT DOCUMENTS

| | | | |
|---|---|---|---|
| 2016/0364989 A1 | 12/2016 | Speasl et al. | |
| 2017/0129603 A1 | 5/2017 | Raptopoulos et al. | |
| 2018/0037412 A1* | 2/2018 | Lynch | B65G 1/00 |

FOREIGN PATENT DOCUMENTS

| | | |
|---|---|---|
| DE | 9214296 U1 | 12/1992 |
| DE | 102006025876 A1 * | 12/2007 |
| DE | 102006025876 A1 | 12/2007 |

\* cited by examiner

SYSTEMS, METHODS, AND APPARATUSES FOR SHIFTING AND STAGING STORAGE STRUCTURES AND PARCELS THEREON

CLAIM OF PRIORITY

This application Ser. No. 16/557,573, entitled "Systems, Methods and Apparatuses for Shifting and Staging Storage Structures and Parcels Thereon," claims priority to U.S. Provisional Patent Application No. 62/725,557, filed Aug. 31, 2018, and entitled, "Systems, Methods and Apparatuses for Shifting and Staging Storage Structures and Parcels Thereon," the entirety of which is incorporated here by reference.

TECHNICAL FIELD

The subject matter of this disclosure relates to systems, methods, and apparatuses for shifting and staging storage structures and parcels thereon in a storage space in order to present them for retrieval.

BACKGROUND

Improving the efficiency of locating, storing, shifting, and retrieving parcels during a parcel routing and delivery process is an omnipresent goal for the logistics industry. As package volume grows each year, the requirement for greater package tracking and faster delivery times increases. This presents an ongoing challenge to logistics carriers that need to streamline all stages of the parcel routing and delivery process, from rotation to routing to delivery, to meet these demands. Further, the demand for faster delivery times results in a need for more efficient parcel storage systems within delivery vehicles that facilitate more rapid locating and retrieving of parcels within the delivery vehicles, and also results in the need to maximize the use of storage space within the vehicle in order to support efficient delivery operation on each delivery route. Therefore, systems, methods, and apparatuses that improve the efficiency in loading, shifting, and presenting parcels for retrieval within a vehicle are needed.

SUMMARY

This summary is intended to introduce a selection of concepts in a simplified form that are further described below in the detailed description section of this disclosure. This summary is not intended to identify key or essential features of the claimed subject matter, and it is also not intended to be used as an aid in isolation to determine the scope of the claimed subject matter.

In brief, and at a high level, this disclosure describes, among other things, systems, methods, and apparatuses for loading, shifting, and/or otherwise adjusting storage structures and parcels thereon within a storage space in order to facilitate efficient staging and retrieval of such parcels, such as, for example, during a parcel delivery process. For example, these systems, methods, and apparatuses may allow for the staging and retrieval of one or more specific parcels at a desired location on a delivery vehicle depending on a delivery route and/or a delivery location that is used/ reached. This staging and presenting of storage structures and parcels thereon may be determined based on a predetermined delivery route or a dynamically selected delivery route, allowing for more efficient parcel loading, staging, and retrieval during a delivery operation.

In example embodiments, a plurality of parcels may be stored on storage structures (e.g., storage carts) located within a vehicle (e.g., a manually or autonomously operated delivery vehicle) or located outside the vehicle in a loading area. Each storage structure may include one or more storage shelves or other parcel support structures, which may be provided in a modular and/or otherwise configurable assembly. In a further aspect, the system, during a delivery operation, may determine which parcels stored in the delivery vehicle are next to be delivered, either based on predetermined information (e.g., a predetermined delivery route) or based on dynamic information (e.g., a real-time delivery route selection made by a vehicle operator or a computer), and then the system, using various shifting/positioning mechanisms and control systems coupled thereto, may adjust the position of the storage structures within the vehicle, so that appropriate parcels are presented for retrieval from the vehicle at a position that reduces or limits the movement required by a delivery vehicle driver to retrieve the parcels at the corresponding delivery location. This dynamic and adaptable positioning of storage structures and parcels located thereon within a vehicle during a delivery process can improve the efficiency and accuracy of the delivery process and reduce time spent locating the correct parcels at a delivery location and also reduce time spent walking within the storage area to retrieve the parcels. Additionally, the dynamic and adaptable positioning of storage structures and parcels can increase the volumetric utilization of the storage area of the delivery vehicle.

In one example embodiment, a system for adjusting parcels within a storage space is provided. The system comprises a support surface, a shifting mechanism, and a plurality of storage structures. The plurality of storage structures are movable along the support surface using the shifting mechanism. Additionally, each of the storage structures is adapted to engage and support one or more shelves. The shifting mechanism comprises a plurality of rollers, at least some of which are powered to provide rotational movement in at least one direction that is imparted to one or more of the storage structures to facilitate shifting thereof. The storage structures may comprise storage carts with each comprising a base with a bottom surface. Each storage cart may be supported on the rollers by its bottom surface. Alternatively, each storage cart may rest on a moving base whose bottom surface is supported by the rollers. Additionally, there may be an optional lift mechanism designed to retrieve the parcels from the storage structure in some embodiments. In other embodiments, the parcels may be manually retrieved from the storage shelves on the storage structures.

In another example embodiment, a system for dynamically positioning and/or staging packages in a storage space based on a travel route is provided. The system comprises a plurality of storage structures each configured to engage and support one or more shelves, a shifting mechanism adapted to dynamically reposition the plurality of storage structures, and a lift mechanism. The lift mechanism is adapted to retrieve objects located on the one or more shelves of the storage structures when the storage structures are in a retrieval position, and reposition the one or more objects for retrieval from the storage space, such as by a person or by an unmanned aerial vehicle (UAV).

This disclosure and the embodiments thereof frequently describe systems for shifting storage structures and parcels thereon in a delivery vehicle (e.g., a delivery truck), but these systems are not intended to be limited to such environments, and other uses of these systems (e.g., in a storage depot or other stationary or mobile location) are possible and contemplated as within the scope of this disclosure.

BRIEF DESCRIPTION OF THE DRAWINGS

The subject matter disclosed herein that relates to systems, methods, and apparatuses for loading and shifting parcels is described in detail with reference to the attached drawing figures, which are intended to illustrate non-limiting examples of the disclosed subject matter, in which like numerals represent like elements, wherein.

DETAILED DESCRIPTION

Figure 1:
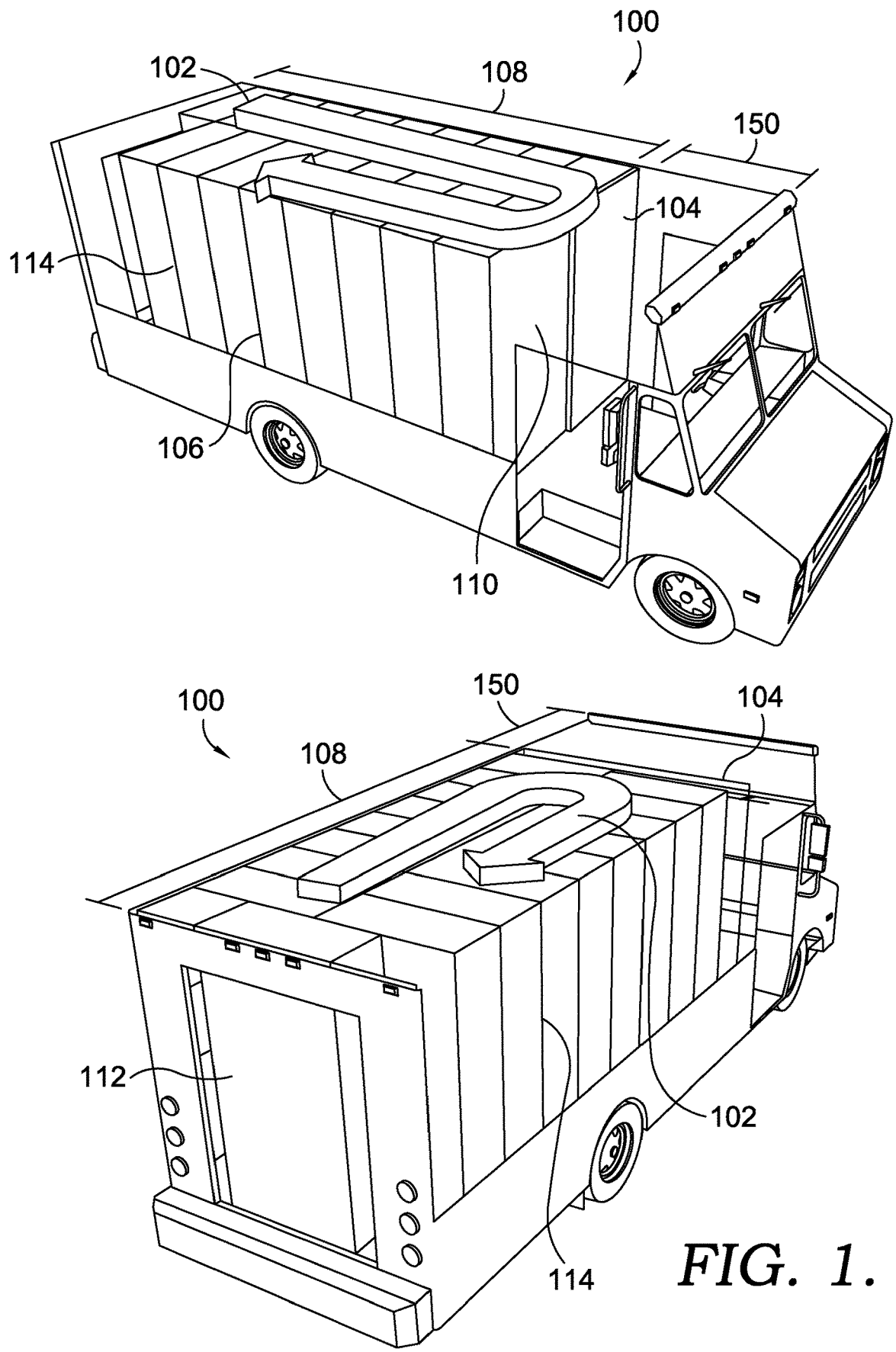
FIG. 1 depicts two perspective views of an example delivery vehicle having a system for adjusting parcels within its storage space, a bulkhead location for retrieval of one or more parcels, and a rear door opening for retrieval of one or more parcels, in accordance with aspects hereof.

The subject matter of this disclosure is described herein to meet statutory requirements. However, the description is not intended to limit the scope of the invention. Rather, the claimed subject matter may be embodied in other ways, to include different steps, combinations of steps, features, and/or combinations of features, similar to those described in this disclosure, and in conjunction with other present or future technologies. Moreover, although the terms "step" and/or "block" may be used herein to identify different elements of methods employed, the terms should not be interpreted as implying any particular order among or between various elements except when the order is explicitly described and required.

In general, this disclosure describes systems, methods, and apparatuses for loading, shifting, and/or otherwise adjusting storage structures and parcels located thereon within a storage space in order to facilitate the efficient and accurate retrieval and delivery of the parcels. These systems, methods, and apparatuses also allow for the staging and presentation of one or more specific parcels stored in a vehicle for retrieval by an operator of the vehicle at a delivery location for the parcels. This staging and presenting may be provided based on a predetermined route or a dynamically selected route, allowing for more efficient parcel loading, staging, and retrieval during a delivery operation.

In example embodiments, a plurality of parcels may be stored on storage structures (e.g., storage carts) located within a vehicle (e.g., a manually or autonomously operated delivery vehicle). Each storage structure may include one or more storage shelves or other parcel support structures, which may be provided in a modular and/or otherwise configurable assembly. In a further aspect, the system, during a delivery operation, may determine which parcels stored in the delivery vehicle are next to be delivered, either based on predetermined information (e.g., a predetermined delivery route) or based on dynamic information (e.g., a real-time delivery route selection made by a vehicle operator), and then the system, using various shifting/positioning mechanisms and control systems coupled thereto, may adjust the position of the storage structures within the vehicle, so that appropriate parcels are presented at the corresponding delivery location for retrieval from the vehicle. This dynamic and adaptable positioning of storage structures and parcels located thereon within a vehicle during a delivery process can improve the efficiency and accuracy of the staging and delivery of the parcels, among other benefits.

Referring to the routing and delivery of parcels, logistics carriers will often maintain delivery data for each shipment that is to be delivered. This dynamically-updated data may include a ship date, an origin address, a destination address, a service level, a forecasted delivery date, a unique identifier (e.g. a parcel tracking number), and exception information, in addition to other possible information. As a parcel moves through the logistics network, the unique identifier is captured and location information related to the shipment is updated in the associated delivery data record.

In general, carriers generate a dispatch plan which is the schedule or route through which a carrier assigns work to carrier service providers (e.g. delivery vehicle drivers) to coordinate and schedule the pickup and delivery of parcels. Dispatch plans are used daily by logistics carriers to manage delivery routes and parcel delivery. Once assigned to a vehicle, the parcels to be delivered are routed to a carrier facility for loading onto the vehicle.

Typically, a carrier facility has a fleet of delivery vehicles that are loaded with corresponding parcels and then dispatched for delivery of those parcels. These parcels may be loaded manually or automatically into the cargo space of the delivery vehicles. However, it is often the case that a delivery driver must manually go into the storage space of a delivery vehicle in order to retrieve a parcel to be delivered at each delivery location. This process of entering the storage space of the delivery vehicle, locating the parcel to be delivered, and manually retrieving the parcel can be time consuming. Even when the parcels are organized on storage structures (e.g., wheeled storage carts) within the storage space in the order of the delivery locations along the delivery route, time may still be wasted entering the storage space to locate and retrieve the parcels at the delivery locations. Further, if a delivery vehicle driver alters the delivery route, even more time will be used to determine where the one or more parcels associated with the "new" next stop are located. Additionally, the current system of storing the one or more parcels limits the use of the full capacity of the delivery vehicle as there needs to be space (e.g. a middle isle) that the vehicle delivery driver can enter to locate and retrieve the parcels for delivery. This also limits the number of deliveries by the delivery driver as the number of parcels that can be stored in the delivery vehicle is less than the full capacity of the storage space.

The subject matter of this disclosure may be provided as, at least in part, a method, a system, and/or a computer-program product, among other things. Accordingly, certain aspects disclosed herein may take the form of hardware, or may be a combination of software and hardware. A computer-program that includes computer-useable instructions embodied on one or more computer-readable media may also be used. The subject matter hereof may further be implemented as hard-coded into the mechanical design of computing components and/or may be built into a system or apparatus for shifting, positioning, and/or staging parcels in a storage space. For example, the subject matter may be incorporated into a control system and computing components thereof for shifting parcels in a storage space.

Computer-readable media may include volatile media, non-volatile media, removable media, and non-removable media, and may also include media readable by a database, a switch, and/or various other network devices. Network switches, routers, and related components are conventional in nature, as are methods of communicating with the same, and thus, further elaboration is not provided in this disclosure. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided herein.

In general, the term "system" may refer to, for example, one or more computers, computing devices, mobile phones, desktops, notebooks or laptops, distributed systems, servers, gateways, switches, processing devices, or a combination of processing devices adapted to perform the functions described herein, as well as mechanical, electrical, hydraulic, and/or other physical systems and/or components. As will be understood, in one embodiment, a parcel shifting system may include a processor that communicates with other computing hardware or software elements within the system via a system interface or bus. The processor may be embodied in a number of different ways. For example, the processor may be embodied as one or more processing elements, one or more microprocessors with accompanying digital signal processors, one or more processors without accompanying digital signal processors, one or more coprocessors, one or more multi-core processors, one or more controllers, and/or various other processing devices including integrated circuits such as, for example, an application specific integrated circuit (ASIC), a field programmable gate array (FPGA), a hardware accelerator, and/or the like.

In one example embodiment, the processor may be configured to execute instructions stored in a device memory or stored such that it is otherwise accessible to the processor. As such, whether configured by hardware or software methods, or by a combination thereof, the processor may represent an entity capable of performing operations according to embodiments of the present invention when configured accordingly. A display device/input device for receiving and displaying data may also be included in, or associated with, the carrier system. The display device/input device may be, for example, a keyboard or pointing device that is used in combination with a monitor. The carrier system may further include transitory and non-transitory memory, which may include both random access memory (RAM) and read-only memory (ROM). The carrier system's ROM may be used to store a basic input/output system (BIOS) containing the basic routines that help to transfer information to the different elements within the carrier system.

In addition, in one embodiment, the carrier system may include at least one storage device, such as a hard disk drive, a CD drive, a DVD drive, and/or an optical disk drive for storing information on various computer-readable media. The storage device(s) and its associated computer-readable media may provide non-volatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices may be connected to the system bus by an appropriate interface.

Furthermore, a number of executable instructions, applications, scripts, program modules, and/or the like may be stored by the various storage devices and/or within RAM. Such executable instructions, applications, scripts, program modules, and/or the like may include an operating system, a dispatch module, and a handling instruction module. The dispatch module and the handling instruction module may control certain aspects of the operation of the parcel shifting system with the assistance of the processor and operating system, although the functionality need not be modularized. In addition to the program modules, the carrier system may store and/or be in communication with one or more databases.

Also located within and/or associated with the system for shifting parcels, in one embodiment, is a network interface for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), and/or any other wired transmission protocol. Similarly, the carrier system may be configured to communicate via wireless external communication networks using any of a variety of protocols, such as 802.11, GSM, EDGE, GPRS, UMTS, CDMA2000, WCDMA, TD-SCDMA, LTE, E-UTRAN, Wi-Fi, WiMAX, UWB, NAMPS, TACS and/or any other wireless protocol.

It will be appreciated that one or more of the system's components may be located remotely from other system components. Furthermore, one or more of the components may be combined and additional components performing functions described herein may be included in the system for shifting parcels.

Referring now to FIG. 1, two perspective views of an example delivery vehicle 100 having a storage structure shifting system 114 incorporated therein are provided, in accordance with aspects hereof. In various embodiments, the delivery vehicle 100 may be a tractor and trailer combination, a van, a truck, a flatbed truck, a package car, and/or any other form of vehicle having a storage area therein. In various embodiments, each delivery vehicle 100 may be associated with a unique vehicle identifier (such as a vehicle ID) that uniquely identifies the vehicle 100. The unique vehicle ID may include characters, such as numbers, letters, symbols, and/or the like. For example, an alphanumeric vehicle ID (e.g., "1221A445533AS445") may be associated with each delivery vehicle 100. In another embodiment, the unique vehicle ID may be the license plate, registration number painted or stickered on the delivery vehicle 100, or other identifying information assigned to and visible on the delivery vehicle 100. FIG. 1 represents an embodiment in which the delivery vehicle 100 is a truck comprising a storage area 108, a front portion 150, and a bulkhead 104 that separates the storage area 108 from the front portion 150. The storage area 108 includes a rear door opening 112 located at a rear of the delivery vehicle 100. A driver of the vehicle is seated at the front portion 150.

Both views of the vehicle 100 shown in FIG. 1 depict, via the numeral 102, the direction (shown as clockwise) that the storage structure shifting system 114 can move each individual storage structure 106 within the storage area 108 of the delivery vehicle 100. It should be understood that the storage structure shifting system 114 depicted in FIG. 1 is merely one example configuration of a system and that many other configurations are possible. Additionally, in FIG. 1, the top surface (roof) and one side of the exterior of the delivery vehicle 100 have been removed to show the inside of the storage space 108 of the delivery vehicle 100 with the storage structures 106 loaded onto the delivery vehicle 100. As seen in the top image of FIG. 1, there is an opening 110 in the bulkhead area 104 from which the delivery vehicle driver (not shown) may retrieve one or more packages for delivery from the storage space 108. The delivery vehicle driver may also retrieve packages from the rear door opening 112 of the delivery vehicle 100.

As described herein, the storage structure shifting system 114 in the vehicle 100 allows any storage structure 106 in the delivery vehicle 100 to be selectively presented to the delivery vehicle driver at various locations including the bulkhead 104 or at the rear door opening 112 for retrieval as shown in FIG. 1. This reduces the need for space within the storage space 108 of the vehicle 100 that is used by the vehicle delivery driver to enter the storage space 108 to retrieve one or more parcels for delivery. As such, the system enables a more complete use of the storage space 108 of delivery vehicle 100 during delivery operations. This allows the vehicle to deliver more parcels on each delivery dispatch, which may reduce delivery time and also reduce operating costs for the logistics carrier associated with the delivery vehicle 100. While FIG. 1 depicts the rear door opening 112 and the bulkhead 104 as two potential locations for retrieval of a parcel, other locations within the delivery vehicle 100, such as but not limited to, one or multiple openings on a side of the delivery vehicle 100, an opening on the roof of the delivery vehicle 100, or doors in the floor of the delivery vehicle 100 configured for release of a delivery robot are contemplated herein as additional potential retrieval locations. A delivery robot may be a wheeled or legged delivery robot that retrieves and transports the parcels form such locations.

Figure 2:
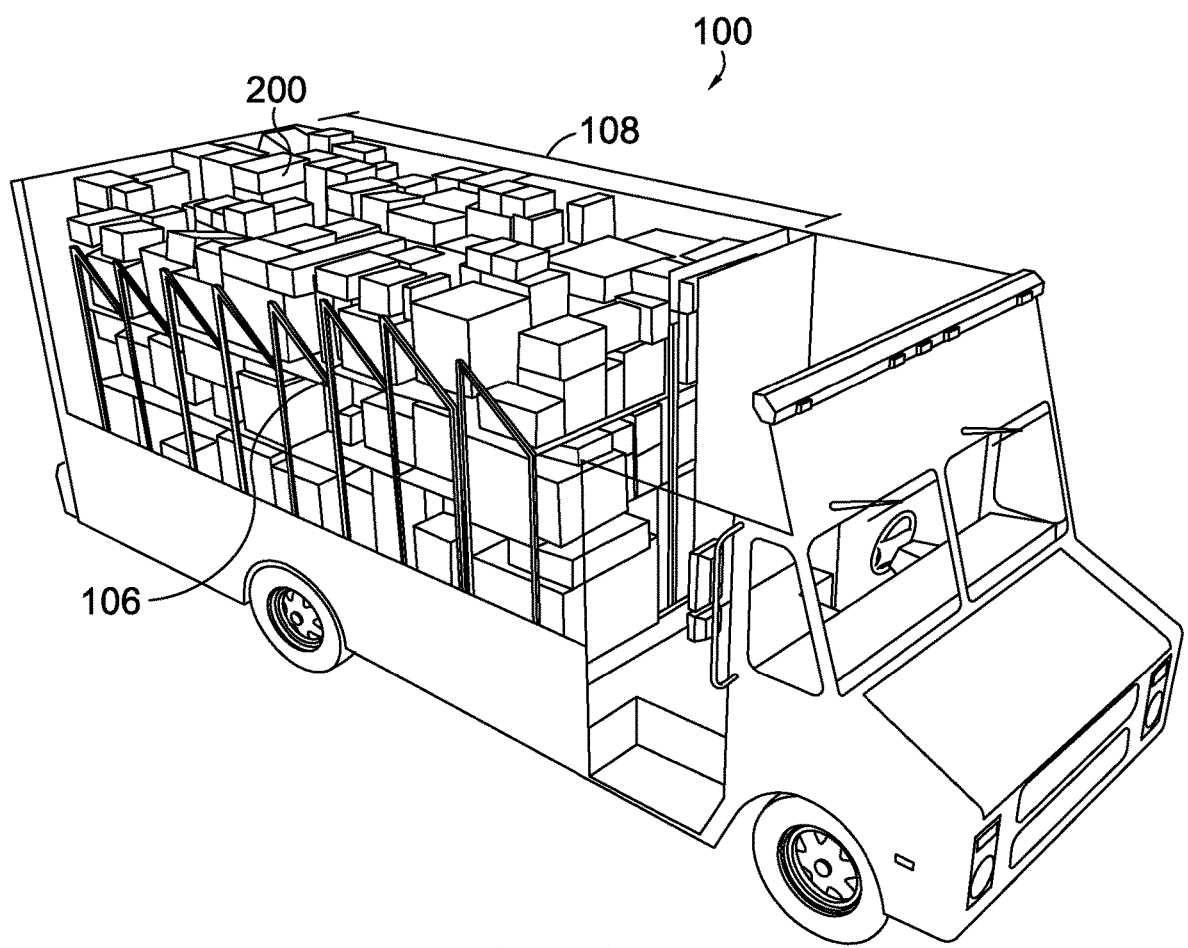
FIG. 2 depicts another perspective view of the example delivery vehicle shown in FIG. 1 that includes the system for adjusting parcels, with FIG. 2 further showing fully loaded storage structures positioned within the storage space of the vehicle, in accordance with an aspect hereof.

Turning to FIG. 2, another perspective view of the delivery vehicle 100 shown in FIG. 1 with the storage structures 106 (e.g., which may be wheeled storage carts as shown elsewhere herein) fully loaded is provided, in accordance with an aspect hereof. As seen in FIG. 2, the delivery vehicle 100 is loaded with parcels 200 of various sizes and shapes, the parcels being located on multiple storage shelves (not shown) located within the storage space 108. While not shown in FIG. 2, the storage shelves may be inserted into or otherwise integrated with the storage structures 106, may be removable, and/or may be inserted into the storage structures 106 at various locations thereof, allowing for storage of parcels of all different sizes and shapes at various positions on the storage structure 106. This allows for the loading of regular and irregular sized or shaped packages (e.g. oversized and/or heavy) through the utilization of different shelving configurations. This is discussed further below with respect to FIG. 3.

Figure 3:
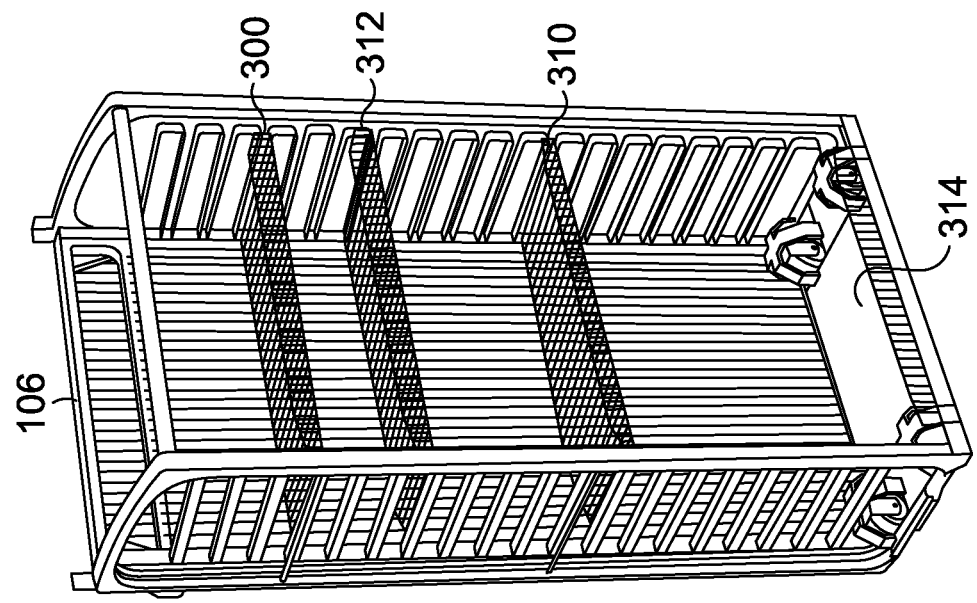
FIG. 3 depicts one example storage structure that comprises a storage cart, integrated 360 degree casters of the storage cart in isolation, and a storage shelf of the storage cart in isolation, in accordance with aspects hereof.
Figure 3:
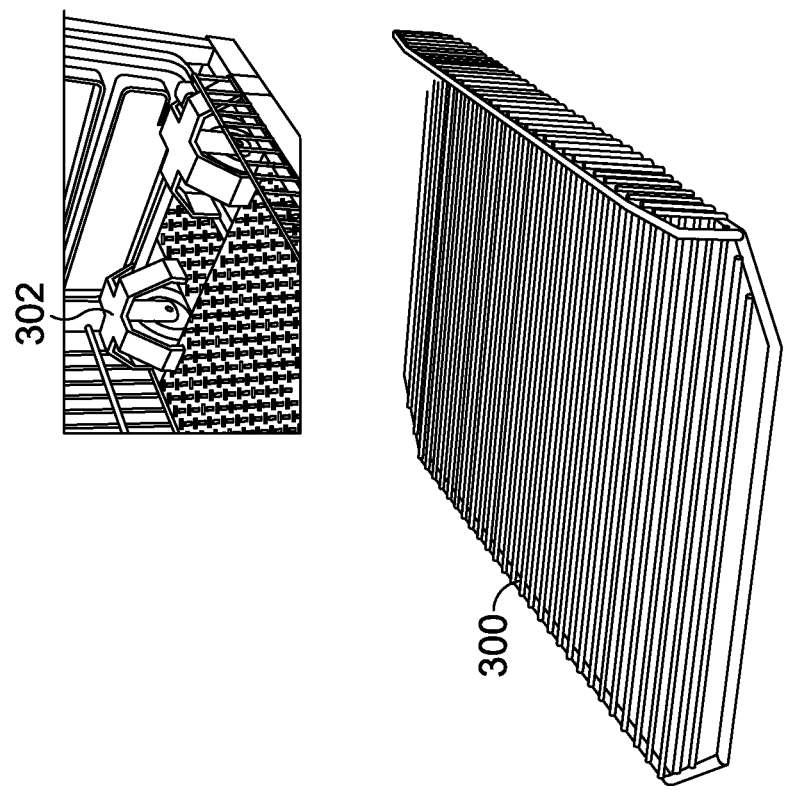

FIG. 3 depicts an example storage structure 106 that is presented for the purposes of the illustrated embodiment as a wheeled storage cart. The wheeled storage cart includes a storage shelf 300 and wheeled casters 302. As seen in the far right image in FIG. 3, the example storage structure 106 includes multiple removable storage shelves 300, 310, and 312 that may be secured to the storage structure 106 at different locations/heights in order to accommodate parcels that may vary in size and shape. For example, as shown in FIG. 3, there are three removable storage shelves 300, 310, and 312 inserted into the storage structure 106. The bottom shelf 310 is placed at a height and with a height-spacing that would allow for packages with a relatively greater height to be placed under it than with the middle shelf 312. In addition to being removable, the storage shelves 300, 310, and 312 may be lightweight, with reduced material portions as shown in FIG. 3, and may include an integrated lip to prevent parcels from moving once loaded onto the storage shelves 300, 310, and 312.

As further shown in FIG. 3, the 360 degree wheeled casters 302 are integrated into the storage structure 106, which allows the storage structure 106 to be rolled across a surface. In some instances, casters similar to those depicted in FIG. 3 are located below the bottom surface of a storage structure 106. By contrast, the integrated wheeled casters 302 shown in FIG. 3 are located at least partially above (e.g., towards a middle of the storage structure 106) the bottom surface 314 of the storage structure 106 such that they are integrated into the storage structure 106 in such a manner that allows for further maximization of the storage space within a delivery vehicle. This integrated design allows the bottom 314 of the storage structure 106 to sit proximate or substantially flush to the support surface of the storage space. This allows for the utilization of additional space which would otherwise be at least partially used by wheeled casters that are not recessed into the storage structure 106.

Figure 4:
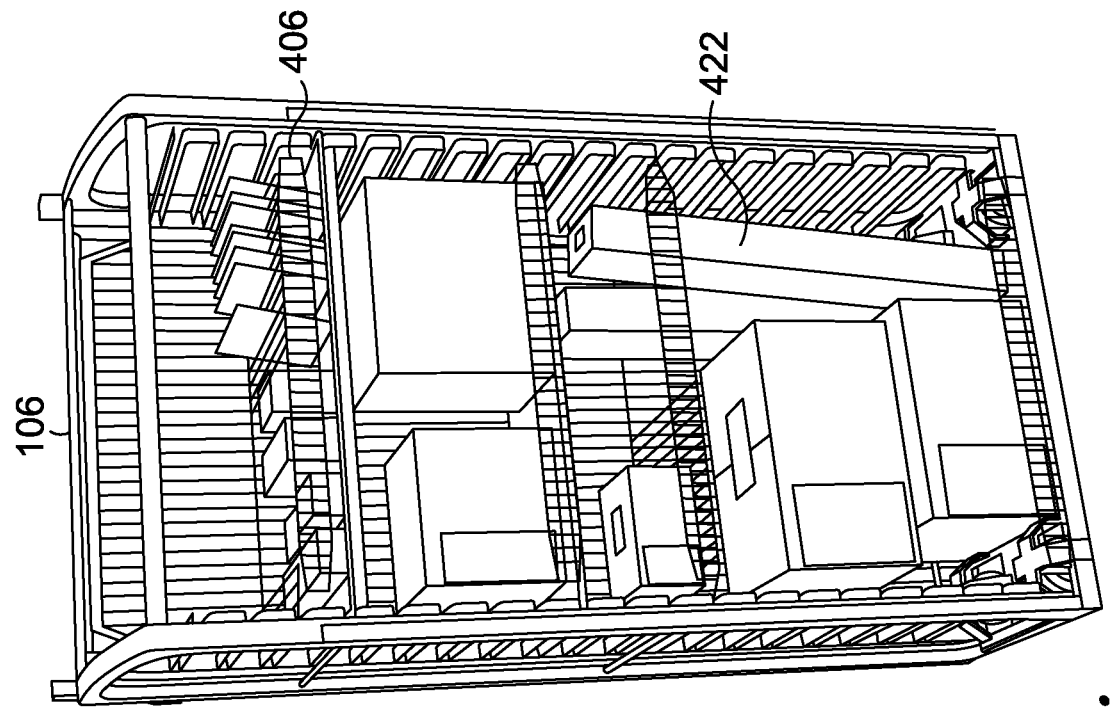
FIG. 4 depicts several example storage shelves that may be used with the storage cart of FIG. 3, in accordance with aspects hereof.
Figure 4:
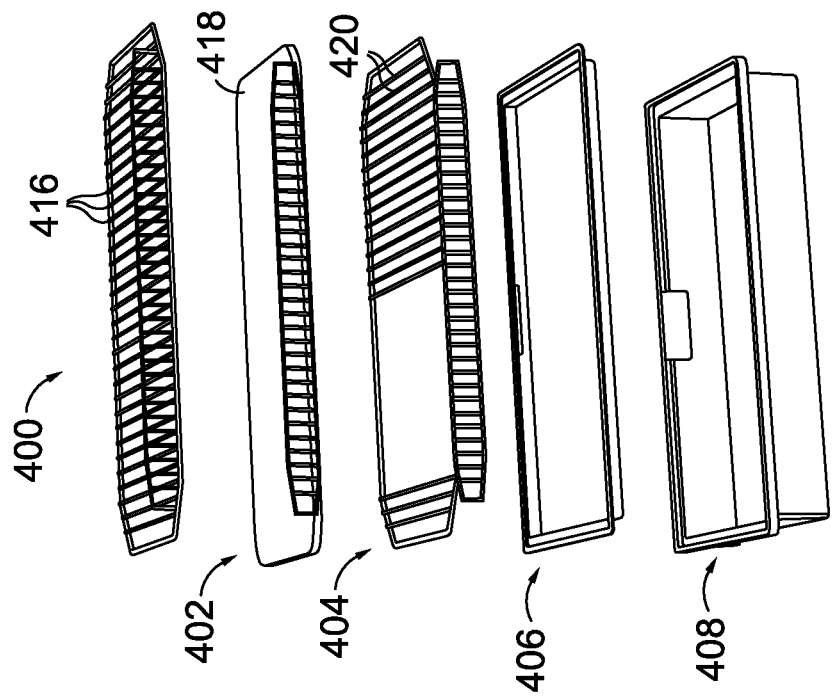

FIG. 4 depicts the storage structure 106 and a variety of example storage shelves that can be removably secured to the storage structure 106 at different locations. As can be seen in FIG. 4, the storage structure 106 is configured so that a variety of different storage shelves 400, 402, 404, 406, and 408 can be secured thereon, thereby increasing the versatility and adaptability of the system in achieving different parcel storing configurations. The storage shelves 400, 402, 404, 406, and 408, as shown in FIG. 4, may differ in size, shape, cross-section, type of support surface, amount or location of reduced material portions, depth, etc., and may utilize common attachment mechanisms (e.g., clips, male-female engaging elements, engaging or mateable protrusions, etc.) to attach the shelves 400, 402, 404, 406, and 408 to the storage structure 106. In various embodiments, the storage structure 106 is sized and shaped to support a plurality of items and to be secured within a delivery vehicle, such as the vehicle 100 shown in FIG. 1.

Referring to the shelves 400, 402, 404, 406, 408 shown in FIG. 4, shelf 400 is a wire shelf comprising a plurality of shelf rails 416 that extend across the shelf 400. Shelf 402 includes an overlay 418 designed to provide support for heavier parcels that may be placed on the shelf 402. FIG. 4 also depicts a half shelf 404 which is designed to be similar to the shelf 400 but with a smaller number of shelf rails 420. Unlike the shelf 400, the shelf rails 420 on the half shelf 404 only extend across a portion of the half shelf 404 (in this case, across approximately half of the half shelf 404). The half shelf 404 is designed to support the storage of long or tall parcels 422 as seen in the storage structure 106 show on the right side of FIG. 4. Additionally, the storage structure 106 may also be configured to receive a shelf 406 that is in the shape of a tray. The shelf 406 may be planar and may be designed to at least partially envelop and/or support small parcels, as shown at the top of the storage structure 106 depicted on the right side of FIG. 4. The shelf 408 may be shaped as a tray with greater depth than the tray of the shelf 406 and may also be removably secured to the storage structure 106. While FIG. 4 illustrates five example storage shelf configurations, which may be integrated into the storage structure 106 in modular fashion, it is contemplated that additional or alternative storage shelves and components are usable with the storage structure 106 or other types of storage structures as described herein.

Figure 5:
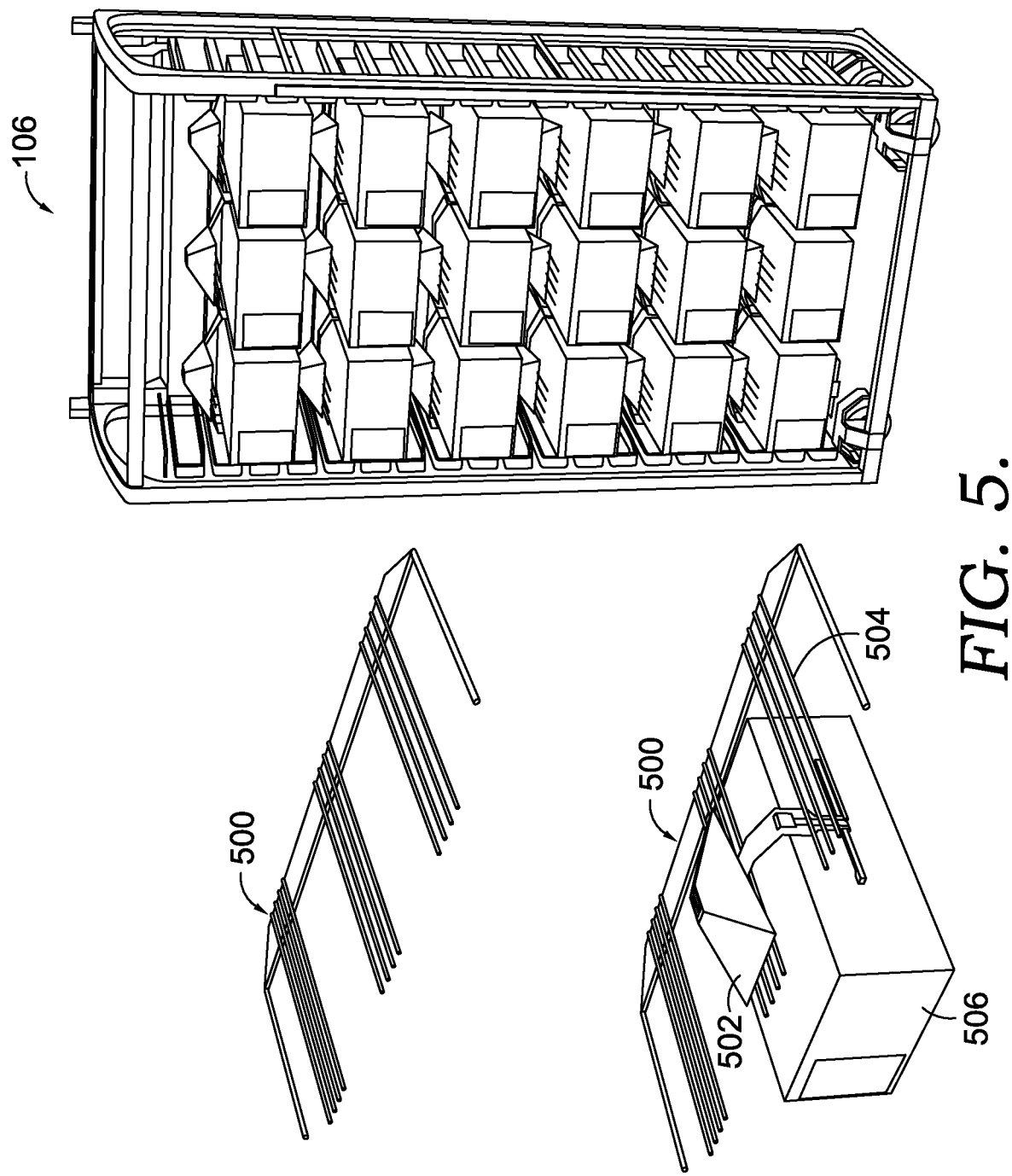
FIG. 5 depicts an example cantilevered storage shelf that can be used with a storage structure as described herein, the storage shelf adapted to allow retrieval of a parcel and battery pack located thereon by a UAV, in accordance with aspects hereof.

FIG. 5 illustrates an example of a cantilevered storage shelf 500 that can be removably secured to a storage structure, such as the storage structure 106 shown in FIG. 5, in accordance with an embodiment hereof. The cantilevered shelf 500 is compatible with the storage structure 106 and can be removably secured to the storage structure 106 in the same manner as the storage shelves discussed in FIG. 4. For example, the storage structure 106 includes side recesses that are sized, shaped, and positioned to receive edges of the shelf 500 or shelves 400, 402, 404, 406, and 408, supporting their attachment and mounting on the storage structure 106. Further, the cantilevered shelf 500 is designed to allow for UAV retrieval of a parcel positioned on the shelf 500. In this respect, looking at FIG. 5, the shelf 500 includes a battery pack 502 that is coupled to the rails 504 extending from the cantilevered shelf 500. The parcel 506 is secured to the battery pack 502. Multiple battery packs 502 and correspondingly coupled parcels 506 may be secured to each cantilevered shelf 500 and then removably secured to the storage structure 106 for retrieval by one or more mateable UAVs. The storage structure 106 shown in FIG. 5 includes three battery packs 502 and three corresponding parcels 506 that are attached to each cantilever shelf 500. As shown, the storage structure 106 has the parcels positioned for retrieval by a UAV, as discussed further below.

Figure 6:
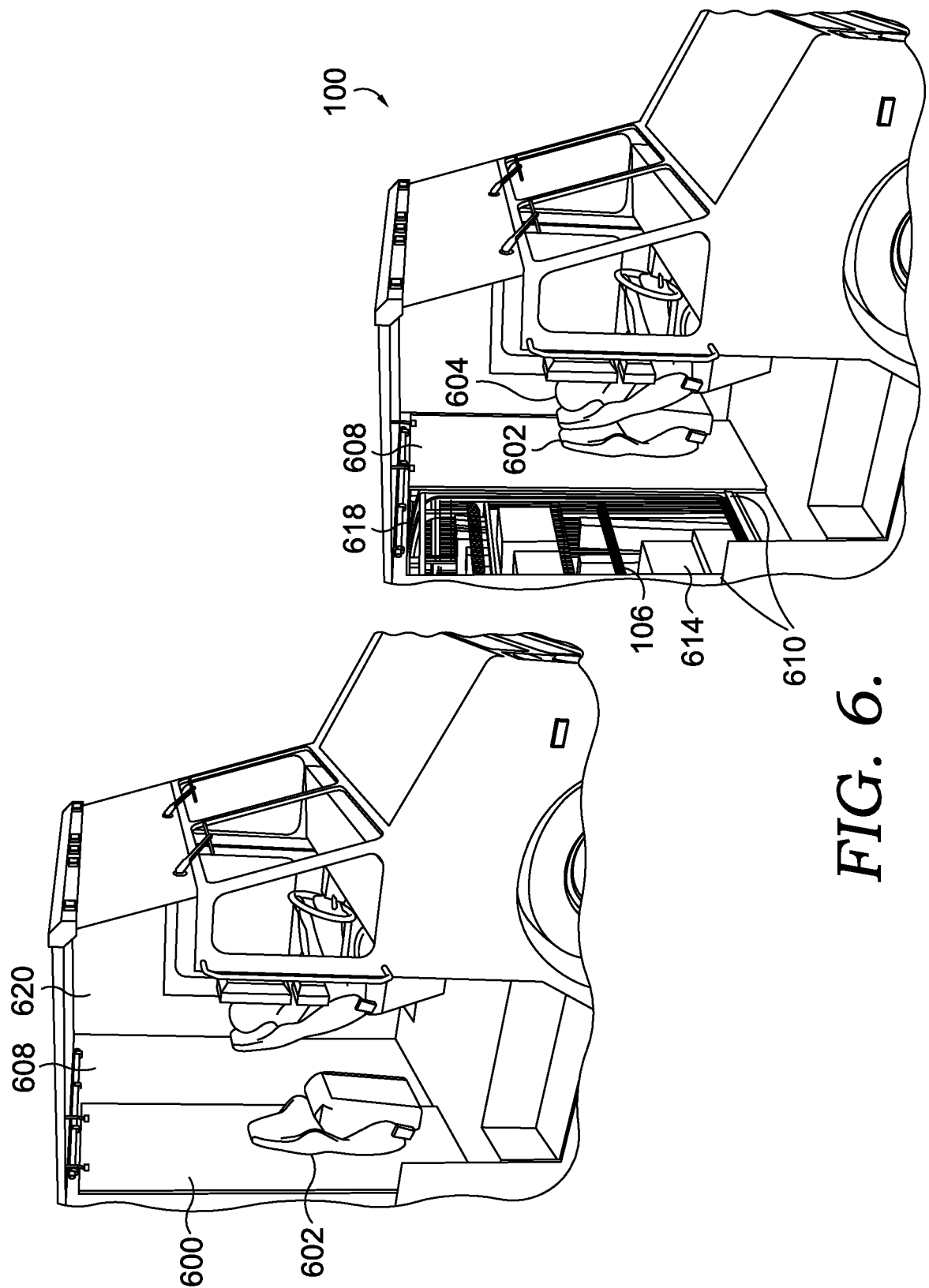
FIG. 6 depicts a side view of a bulkhead portion of an example delivery vehicle that may include the systems and apparatuses described herein, in accordance with an aspect hereof.

FIG. 6 illustrates a sliding bulkhead door 600 and helper seat 602 located in a delivery vehicle adapted for shifting and staging parcels stored therein, in accordance with aspects hereof. The helper seat 602 is secured to the sliding bulkhead door 600. When the delivery driver 604 needs to retrieve one or more parcels 614 through the bulkhead 608 of the example delivery vehicle 100, the sliding bulkhead door 600 can be moved laterally so that the storage space 610 is accessible by the driver 604 from the front portion 620 at the bulkhead 608. When the sliding bulkhead door 600 is moved to open the storage space 610, the secured helper seat 602 slides behind the delivery vehicle driver's seat 612 as shown in FIG. 6. This design supports greater access to the storage space 610 and also allow for access to the storage structure 106 directly from the bulkhead 608. This design also reduces the need for the delivery vehicle driver 604 to leave the front portion 620, open the back door (not shown) of the delivery vehicle 100, and enter the delivery vehicle 100 to locate and retrieve one or more parcels 614 for delivery. Instead, the system, as described herein, will move the storage structures 106 using a shifting mechanism (not shown in FIG. 6 but discussed further below), so that the storage structure 106 comprising the one or more parcels 614 that are to be delivered by the vehicle driver 606 is located at the bulkhead 608 for easy retrieval when the sliding bulkhead door 600 is moved laterally to open the storage space 610.

To describe one example parcel delivery operation, a computing system associated with the parcel shifting and staging system located within the vehicle 100 may detect that parcel 1 is to be delivered to destination A along the delivery route. Upon making this determination, the system may activate the shifting mechanisms described further below to move the storage structures 106 into a different position and/or arrangement so that the storage structure 106 comprising parcel 1 is moved to the bulkhead opening 618 for retrieval by the vehicle driver 604 at the appropriate time (e.g., when the vehicle arrives at destination A). While the storage structures 106 (shown in FIG. 2) are moved to the bulkhead 608 so that the one or more parcels 614 located thereon can be retrieved for delivery, it is contemplated that in another aspect the system may move the storage structures 106 similarly but instead to a rear door of the delivery vehicle 100, which allows the vehicle delivery driver 604 to retrieve the appropriate parcel for delivery at the rear door instead of at the bulkhead 608. Either or both of these retrieval processes are contemplated herein.

Continuing with FIG. 6, the helper seat 602 is foldable and designed to slide behind the vehicle driver's seat 612 when the sliding bulkhead door 600 is moved laterally to an open position. Additionally, the helper seat 602 is also removable so that when it is not needed, it can be removed, providing more free space in the bulkhead 608. Finally, the helper seat 602 is also designed to enhance comfort for an individual helper who may be seated in the helper seat 602 during the delivery vehicle 100's delivery route.

Figure 7:
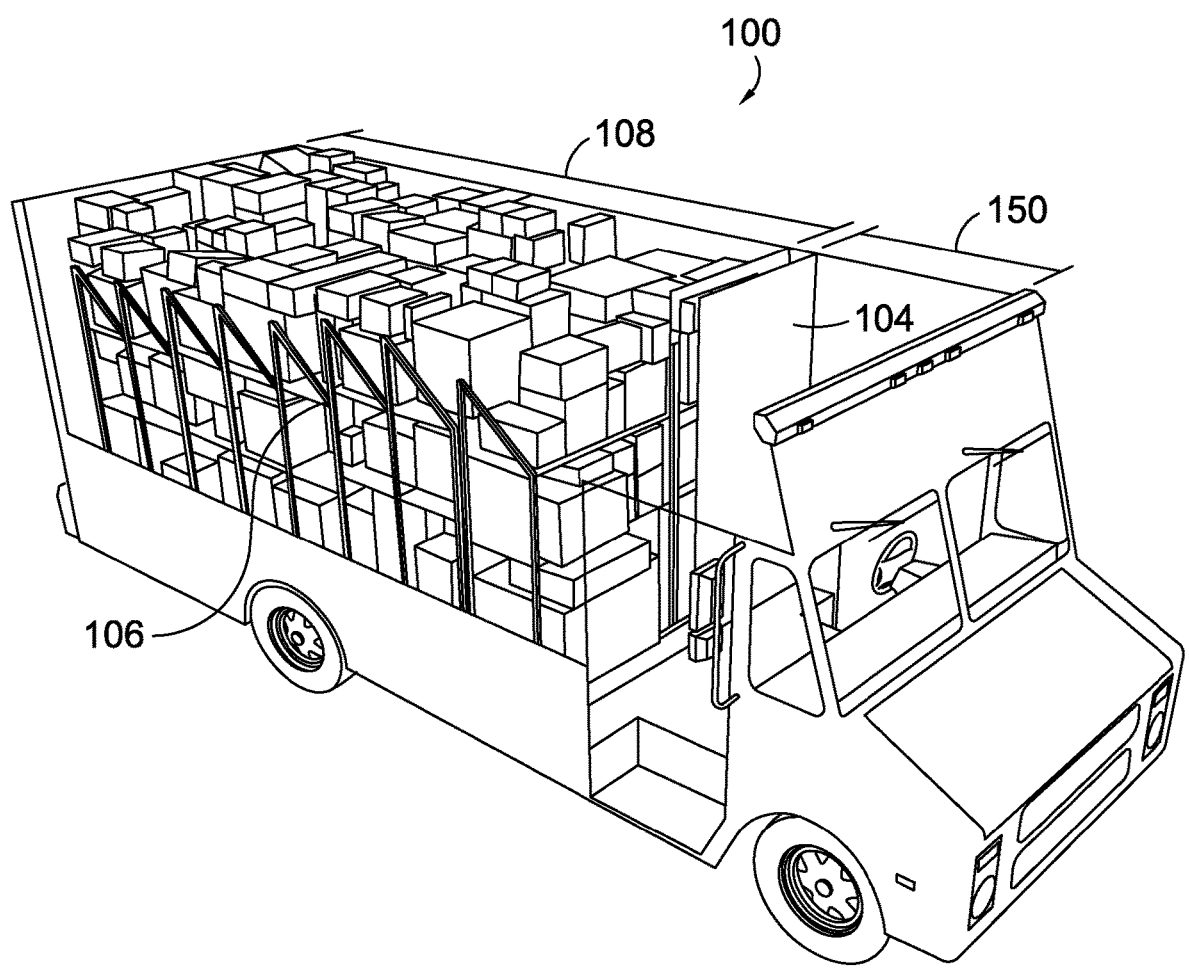
FIG. 7 depicts a perspective view of an example delivery vehicle with its storage space loaded with parcels, in accordance with an aspects hereof.

FIG. 7 depicts the delivery vehicle 100 of FIG. 1 with multiple storage structures 106 loaded with parcels stored therein, in accordance with an aspect hereof. As shown in FIG. 7, the parcel shifting and staging system in the vehicle allows for increased use of the storage space 108 relative to a design that includes space for a vehicle driver to enter the storage space 108.

While the parcel shifting and staging system in the vehicle improves the delivery process, there are still several challenges presented by parcel loading allocation and delivery sequencing. Challenges presented include: 1) documenting the storage structure 106 with which each parcel is associated, and 2) identifying one or more parcels that are designated for the delivery at a next stop in a delivery route. Documentation of the parcels that are placed in each storage structure 106 can be done via 3D scanning technology, using RFID triangulation technology, or via manual loading and tracking of the parcels into the storage structures. Additionally, if a computer-controlled robot is utilized to load the storage structures, the computer-controlled robot may record the location that each parcel is loaded onto and/or communicate information related to the same to a computing system associated with a logistics carrier and/or with the delivery vehicle.

As the delivery vehicle driver 604 makes each stop, the system may, including in advance of arriving at the destination, identify which parcel is needed so that the corresponding storage structure 106 and relevant parcels are in position for retrieval. The system may identify the relevant parcels and move the appropriate storage structure 106 to the bulkhead 104 or rear door opening 112 for parcel retrieval in response to the delivery vehicle driver 604 triggering the system to prepare for the next delivery location, or based on the pre-established delivery route used by the driver to deliver the parcels. Additionally, utilizing artificial intelligence, a delivery guidance system may know the delivery route and automatically move the storage structures upon the determination that the delivery vehicle is en route or has arrived at each delivery location. Further, the delivery guidance system may modify the travel route based a variety of conditions (e.g. traffic conditions, weather conditions, etc.).

Figure 8:
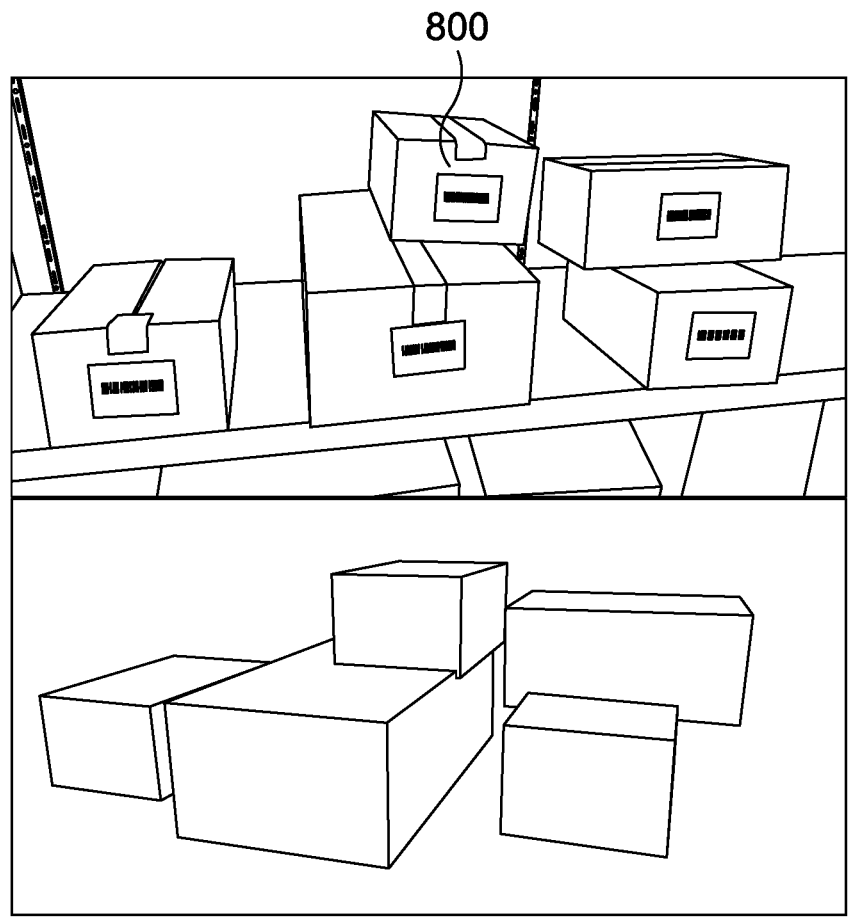
FIG. 8 depicts example parcels that may be loaded onto storage structures for delivery, in accordance with aspects hereof.

FIG. 8 depicts multiple example parcels 800 that may be loaded onto storage structures 106 for delivery via the delivery vehicle 100, in accordance with an aspect hereof. As mentioned, parcel allocation may be completed via 3D scanning technology, using RFID triangulation technology, and/or using manual loading processes and tracking. If 3D scanning technology is used, each parcel 800 may be captured while each storage structure 106 is being loaded onto the vehicle 100 using a 3D camera sensor that is linked to a barcode scanner, a RFID reader, or any other system that can identify the parcels 800, such as a computer-controlled vision system. Alternatively, image recognition technology (e.g., optical character recognition (OCR)) may be utilized to identify which parcels are being loaded onto each storage shelf in each storage structure 106. Further, intelligent systems may be utilized to identify parcels by determining distinctive attributes of the parcels, such as the texture, shape, and size of the parcels.

When RFID triangulation technology is used, each parcel will include an RFID label on the parcel 800's exterior surface. The RFID labels may be captured by antennas and sensors placed on the storage structures 106, on the loading structure area, or in the storage area 108 in the delivery vehicle 100. Individual loaders responsible for loading the one or more parcels 800 onto each storage structure 106 may have a handheld mobile device that directs the loader as to which storage structure 106 and storage shelf 300 each parcel 800 should be loaded. Individual loaders may utilize loading charts that specify which storage structures 106 and storage shelves 300 are assigned to each postcode range to ensure that the parcels 800 going to the same destination are placed in the same storage structure 106. The parcels 800 may be loaded onto the storage shelves 300 of the storage structures 106 manually by the loaders, or mechanically by automated apparatus, such as a CNC or multi-axis loading robot.

During the loading process, an associated shipping indicia for each parcel 800 may be captured. In various embodiments, the shipping indicia may include an item/shipment identifier and/or a destination address. The captured shipping indicia may be transmitted to the one or more logistics carrier computing systems. The one or more logistics carrier computing systems may identify the destination information (either captured or determined using the item/shipment identifier) and compare the destination address against a dispatch plan to determine which route/vehicle is assigned to deliver parcels to the destination address. In some embodiments, the destination address may be captured and sent to the one or more logistics carrier computing systems in addition to or in place of the item/shipment unique identifier. In addition to identifying the route/vehicle, the one or more carrier systems may also identify which storage structure 106 and storage shelf 300 thereof is supposed to hold the particular parcel 800. The one or more logistics carrier computing systems may then generate a handling instruction identifying the appropriate route/vehicle, storage structure, and storage shelf for the delivery.

Figure 9:
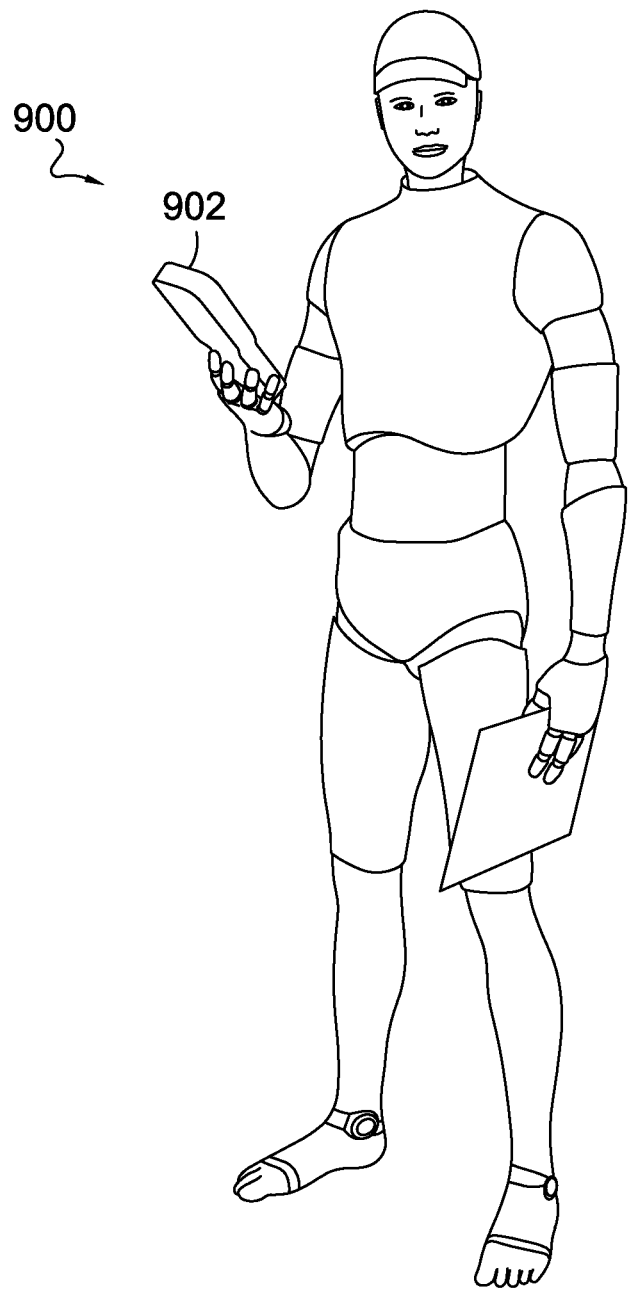
FIG. 9 depicts a delivery vehicle driver 900 that will utilize artificial intelligence and intelligence augmentation during the parcel delivery process, in accordance with aspects hereof.

Turning next to FIG. 9, which depicts a delivery vehicle driver 900 that will utilize artificial intelligence and intelligence augmentation during the parcel delivery process, in accordance with aspects herein. Conventional AI systems are designed to replace the delivery driver's experience with advanced algorithms. However, the AI decisions are based on available structured data only. As such, at times, the AI does not account for considerations such as real-time events, such as road construction, road accidents, weather, traffic delays, etc. Further, delivery vehicle drivers are experienced in navigating their delivery routes and provide a unique source of delivery and routing intelligence that may be used to augment the structured data used by AI. As such, it is contemplated that AI assisted routing in combination with driver intelligence augmentation can be used with the present embodiments to further improve the efficiency and process of delivering parcels.

Referencing one example system that dynamically uses driver intelligence augmentation in combination with AI, a delivery route guidance system 902 may propose the best sequence of stops on a delivery route based on the aforementioned structured data, while still allowing the delivery vehicle driver 900 to trigger an alternative selected route sequence. Additionally, the delivery route guidance system 902 may dynamically learn from the changes triggered by the vehicle driver to utilize the acquired knowledge for future delivery route generation. Additionally, the delivery route guidance system 902 may provide suggestions for the sequence of stops and the delivery route based on a mix of road and traffic concerns (current and foreseen for the day), weather forecast and past impact on traffic, past delivery decisions of the vehicle driver or drivers on the same route, specific past behavior of a consignee of the parcel to be delivered, and/or real time information provided by the consignee. For example, the delivery route guidance system 902 may provide advice based on when the consignee is usually home or if the consignee has notified the logistics carrier that he or she will not be home for a period of time or at specific dates or times. Utilizing this information, the delivery route guidance system 902 may dynamically adjust the sequence of stops and, in turn using the storage structure shifting and staging embodiments described herein, rearrange the movable storage structures 106 in a delivery vehicle 100 so that the appropriate parcels are staged for retrieval. The delivery route guidance system 906 may further provide visibility of current delivery routes, alternate delivery routes, staging of parcels, and other information on an interface viewable by the delivery vehicle driver 900, which may also provide route recommendations and show performance analysis for the delivery vehicle driver 900.

Figure 10:
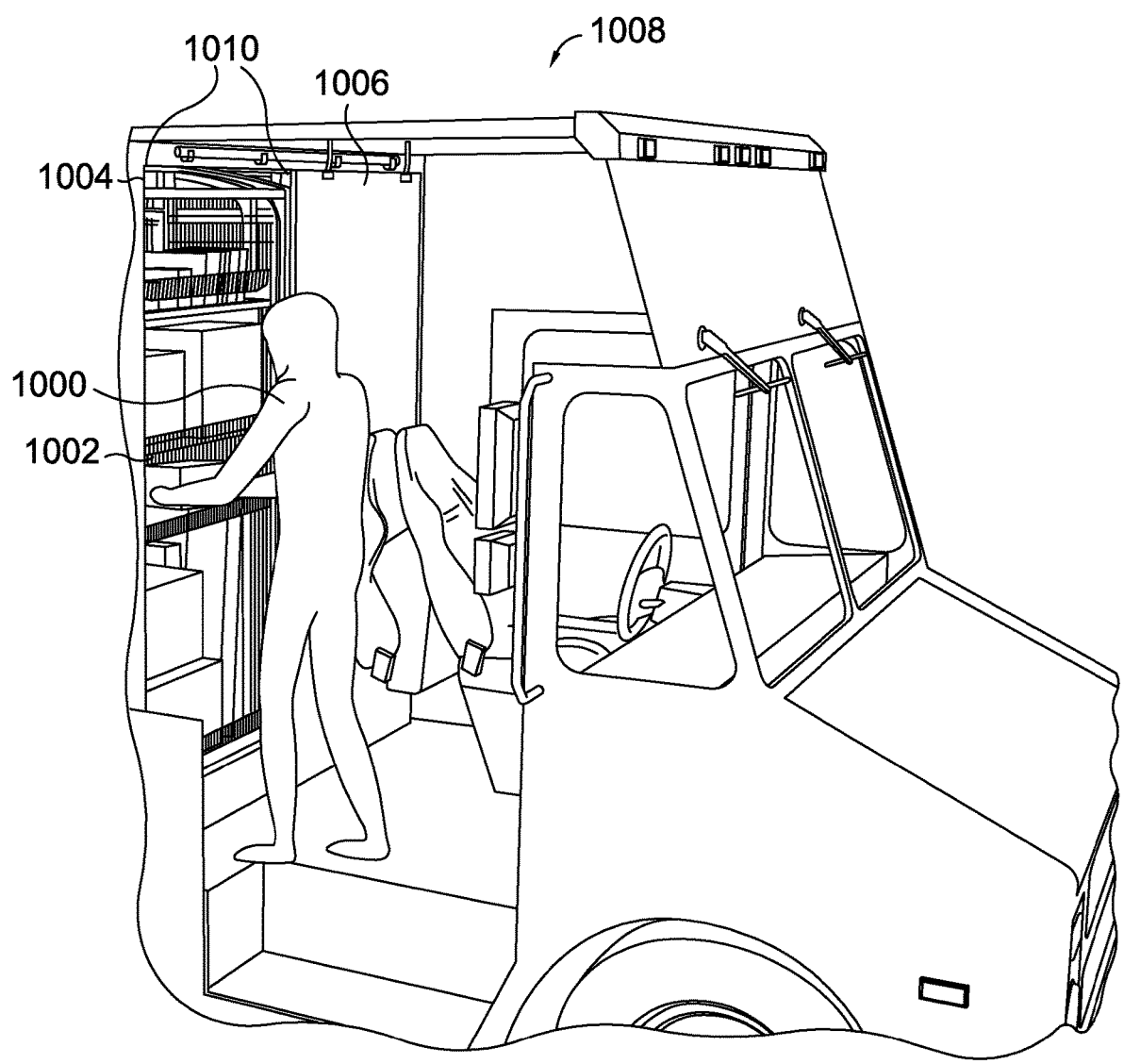
FIG. 10 depicts an example delivery vehicle driver retrieving one or more parcels from a storage structure positioned at a bulkhead of a delivery vehicle, in accordance with aspects hereof.

FIG. 10 depicts an example delivery vehicle driver 1000 retrieving one or more parcels 1002 from a storage structure 1004, which in the illustrated example of FIG. 10 is a storage cart, located at a bulkhead 1006 of a delivery vehicle 1008, in accordance with an aspect hereof. In FIG. 10, the storage structure 1004 has been moved to the bulkhead opening 1010 by a storage structure shifting mechanism located within the storage space of the vehicle 1008. The storage structure shifting mechanism is used to arrange the storage structure 1004 based on the delivery route and present the storage structure 1004 to the driver 1000 at the bulkhead opening 1010 or rear door (not shown) when the vehicle 1008 arrives at the appropriate delivery destination. The storage structure shifting mechanism is linked to the delivery route guidance system which guides the operation of the storage structure shifting mechanism so that the appropriate storage structures 1004 are staged before the stop at which they are to be delivered is reached. This increases the speed, efficiency, and accuracy with which parcels can be retrieved and delivered. This also prevents unnecessary delays due to waiting for the storage structure shifting mechanism to cycle the appropriate storage structure by staging the appropriate storage structure in advance, or by waiting for the vehicle delivery driver to locate the parcel on their own. As such, the storage structure shifting mechanism and delivery route guidance system intelligently function in combination to dynamically adjust and stage the storage structures not only based upon the next stop in the delivery route as planned, but also based upon any changes to the route made by the system or by the delivery vehicle driver.

Figure 11:
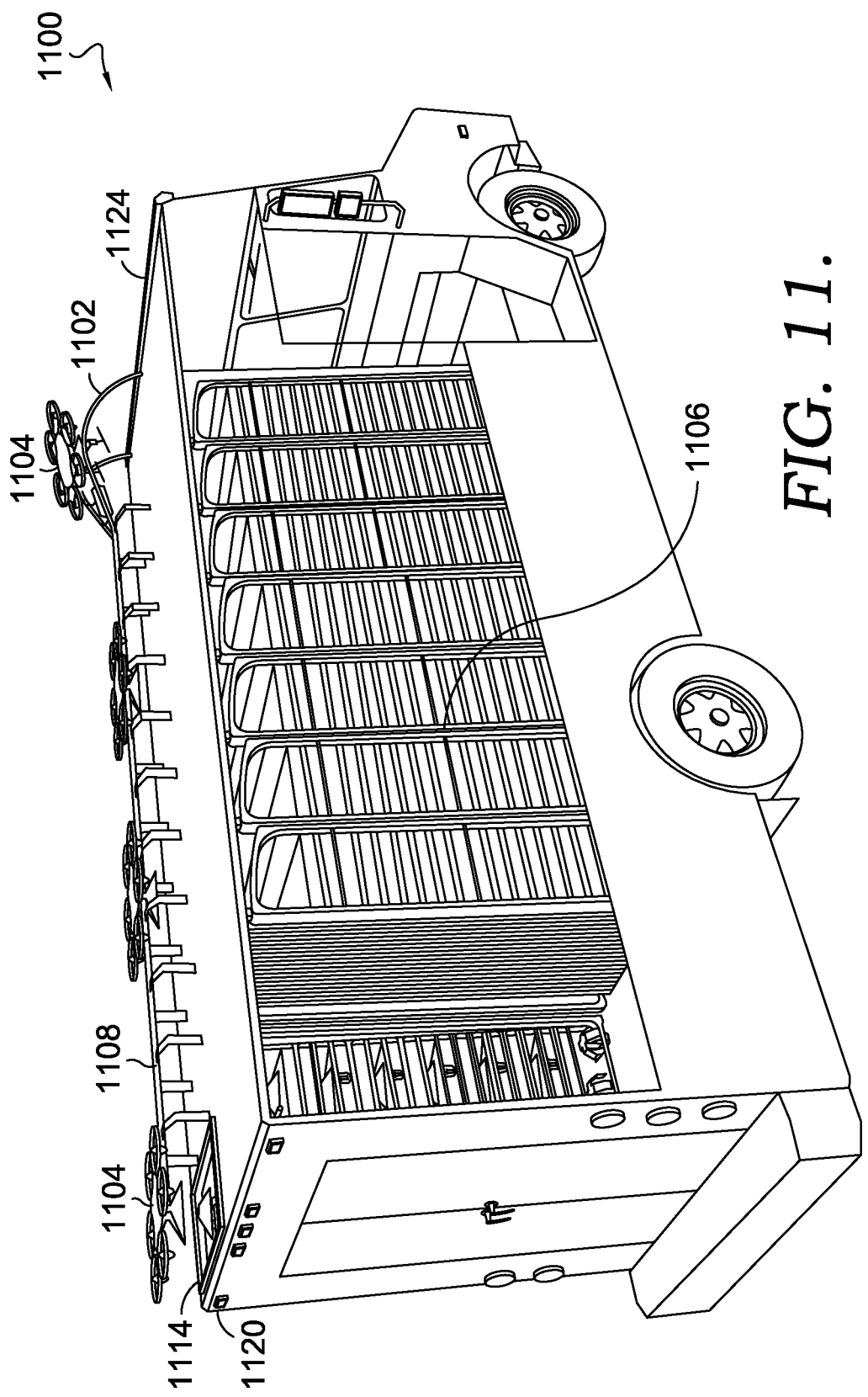
FIG. 11 depicts a side perspective view of a delivery vehicle with a storage structure shifting system, UAVs, and a rail system on the roof of the delivery vehicle for the UAVs, in accordance with aspects hereof.

FIG. 11 depicts a perspective view of the delivery vehicle 1100, storage structures 1106, and a UAV 1104 that is mateable/useable with an associated rail system 1108 (e.g., as described in U.S. Provisional Patent Application 62/329, 491, filed on Apr. 29, 2016) located on the roof 1124 of the delivery vehicle 1100, in accordance with an aspect hereof. After making a delivery of a parcel, the UAV 1104 lands on the rail system 1108 at a docking location 1102. The UAV 1104 lands with the battery pack (not shown) still attached. Upon landing, the UAV 1104 moves along the rail system 1108, deposits the used battery pack 1114 (not shown in FIG. 11) at some deposit location along and under the rail system 1108, and then moves to retrieve the next parcel for delivery.

In one aspect, the UAV 1104 may disengage the battery pack 1114 along the rail system 1108, depositing it onto a storage structure 1106 (e.g., an empty storage structure from which parcels where already retrieved). The removal of the battery pack 1114 from the UAV 1104 may occur anywhere along the rail system 1108 where there is an opening (such as an automated roof hatch) or deposit receptacle.

Continuing with FIG. 11, in some embodiments, there may be an open or adjustable hatch 1120 located towards the rear of the delivery vehicle 100, positioned over the storage area of the vehicle 100. In such a configuration, once the UAV 1104 has made a delivery, the UAV 1104 returns to the vehicle 100 and can land on the rail system 1108. The UAV 1104 proceeds down the rail system 1108 to the hatch 1120 which may be used by the UAV 1104 for depositing the battery pack 1114 onto an assigned storage shelf on a designated storage structure 1106. Once the UAV 1104 has moved along the landing rail 1108 and is in position above the hatch 1120, it retrieves the battery pack 1114 and parcel 1118 (shown in FIG. 12) from the storage space for delivery. The battery packs 1114 may, in the described aspect, be designed for single delivery use, but it is also envisioned that the system may utilize battery packs 1114 that can be reused. If used for a single delivery, the UAV 1104 will disengage and "drop off" the battery pack 1114 upon arrival back at the delivery vehicle 100 after making a parcel delivery. In alternate embodiments, if the battery pack 1114 is used for multiple deliveries, then the UAV 1104 will travel along the rail system 1108 to the hatch opening 1120 to retrieve the next parcel for delivery.

Figure 12:
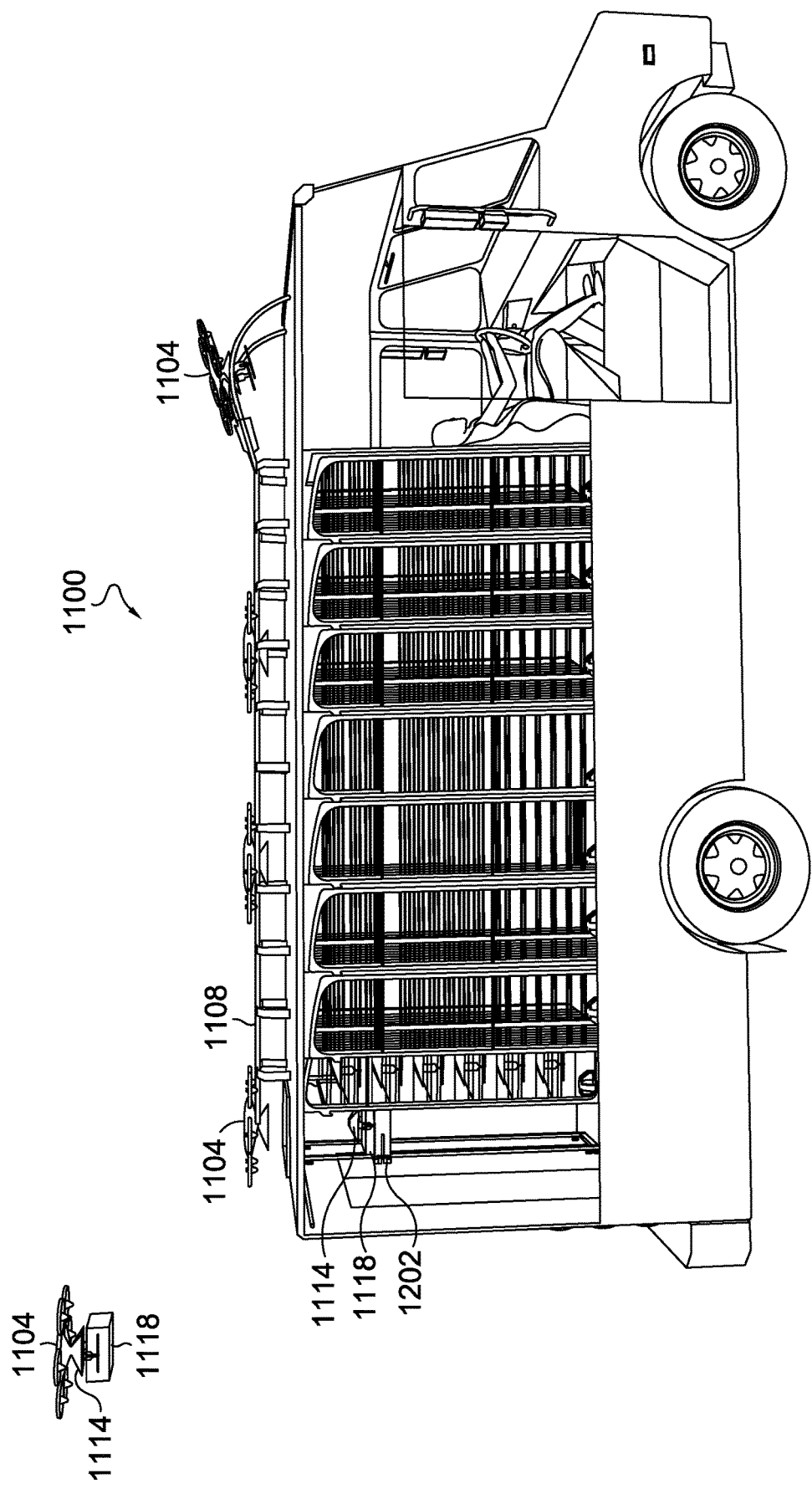
FIG. 12 depicts another side view of the delivery vehicle of FIG. 11 and illustrates the UAV returning from delivery to the rail system and then departing with a new parcel for delivery, in accordance with aspects hereof.

FIG. 12 also illustrates a lifting mechanism 1202 that lifts the parcel 1118 and attached battery pack 1114 off a storage shelf located on a storage structure in the storage space, and places the parcel 1118 and battery pack 1104 in position for retrieval by the UAV 1104. Referring back to FIG. 5, the cantilevered shelves 500 are illustrated on which each parcel would be supported by a connected individual battery pack 1114. This allows the UAV 1104 to retrieve the parcel 1118 and battery pack 1114 together. Upon attachment of the battery pack 1114 and parcel 1118 to the UAV 1104, the UAV 1104 may exit the landing rail 1108 and depart to deliver the parcel 1118 as shown in FIG. 12.

Figure 13:
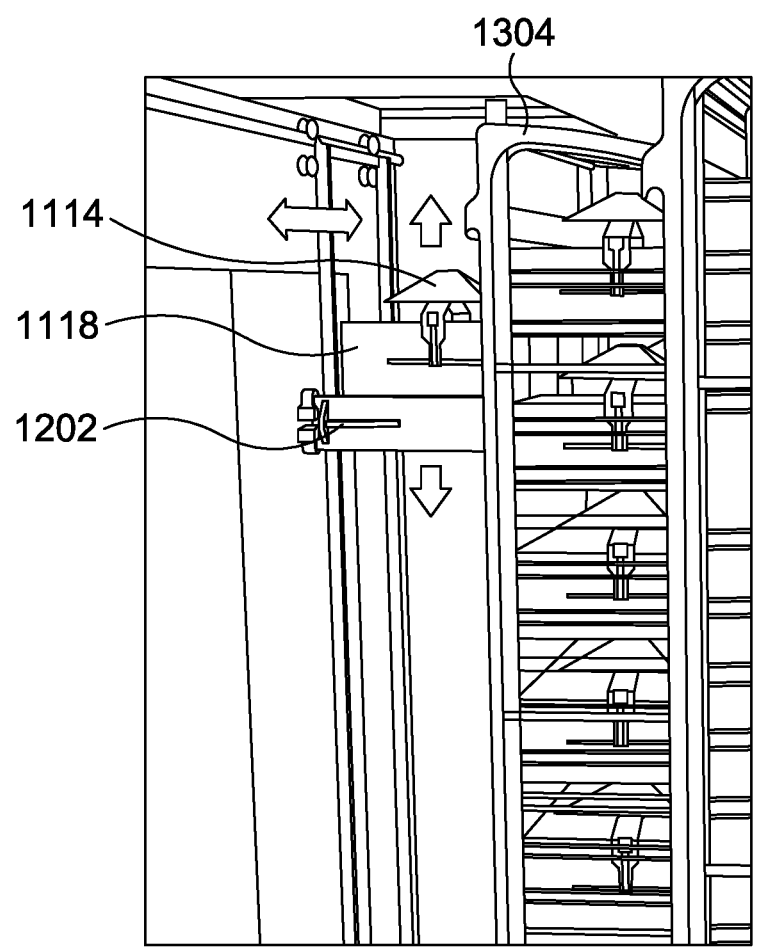
FIG. 13 depicts an example lift mechanism that positions a parcel and battery pack for retrieval by a UAV, in accordance with an aspect hereof.

FIG. 13 depicts an enlarged view of the lift mechanism 1202 shown in FIG. 12 that is used to remove the coupled battery back 1114 and parcel 1118 from the exemplary storage structure 1304 located in the vehicle 100 shown in FIG. 12 and lift it for retrieval by the UAV 1104 at the hatch opening 1120.

Figure 14:
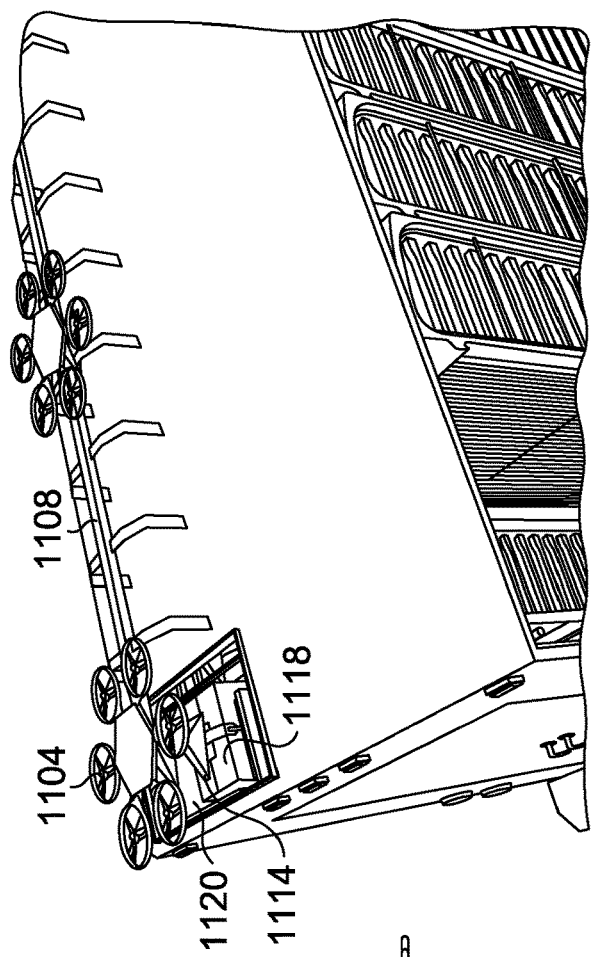
FIG. 14 depicts a partial side view and partial top perspective view of the delivery vehicle of FIG. 12 with a parcel ready for retrieval by a UAV via a roof hatch, in accordance with aspects hereof.
Figure 14:
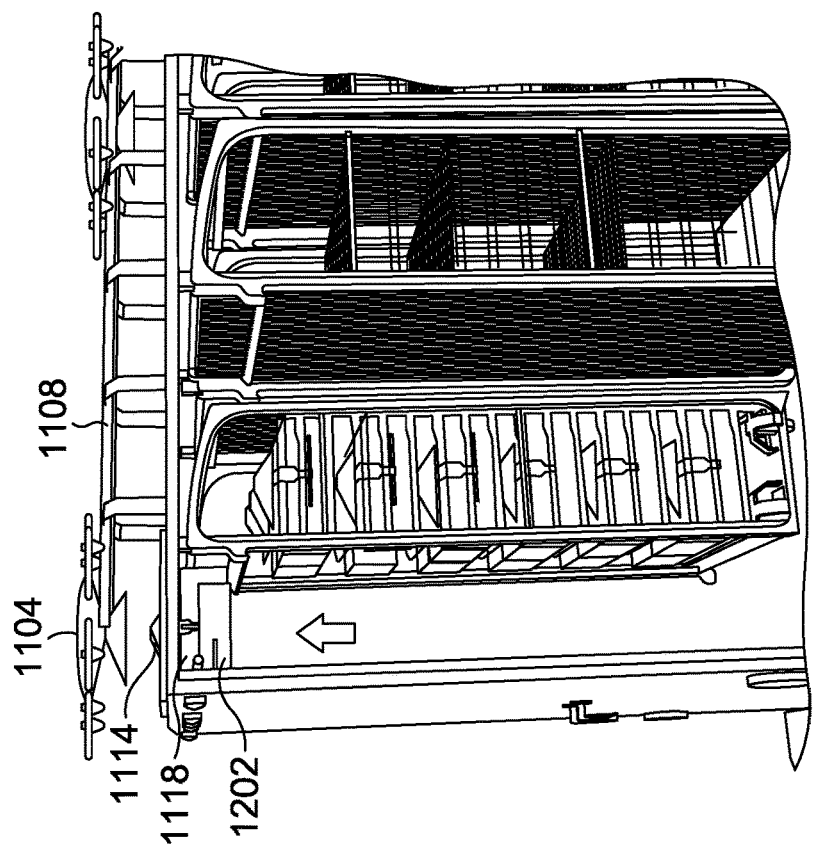

FIG. 14 depicts two additional side views of the UAV rail 1108 shown in FIG. 12. The left image depicts the parcels 1118 with the battery packs 1114 coupled, with the combined parcels/battery packs stored in the storage structure 1304 awaiting retrieval by the UAV 1104. As also seen in FIG. 14, the UAV 1104 is in place above the roof hatch opening 1120 and the lift mechanism 1202 has retrieved the coupled parcel 1118 and battery pack 1114 off one of the storage shelves of the storage structure 1304 and moved the coupled battery pack 1114 and parcel 1118 vertically to be retrieved by the waiting UAV 1104. The roof hatch opening 1120 enables the removal of a spent battery pack 1114 and loading of a new battery pack 1114 coupled with a parcel 1118 that is ready for delivery. In the right image shown in FIG. 14, the UAV 1104 has progressed along the landing rail 1108 to the roof hatch opening 1120, and the battery pack 1114 and parcel 1118 are in position awaiting retrieval by the UAV 1104. It should be noted that while FIGS. 12-14 depict a single rail system 1108 on the delivery vehicle 100, it is contemplated that delivery vehicle 100 may comprise two or more rail systems to allow for additional and more rapid parcel and battery pack retrieval.

FIGS. 15-22 illustrate the various ways the example storage structures described herein may be shifted and staged in a storage space using the shifting mechanisms and control systems described herein. Four design embodiments are presented in FIGS. 15-22, but additional designs are contemplated, and these designs are provided as non-limiting example aspects. In a first depicted configuration, the movement of the storage structures is facilitated from below the storage structures; in the second depicted configuration, the movement of the storage structures is facilitated from the top of the storage structures; in the third depicted configuration, the movement of the storage structures is facilitated from the side of the storage structures; and in the fourth configuration, the movement of the storage structures is facilitated from the middle of the storage structures. The movement from each position is provided by a shifting mechanism which may comprises one or more actuators and engaging components as described herein.

Figure 15:
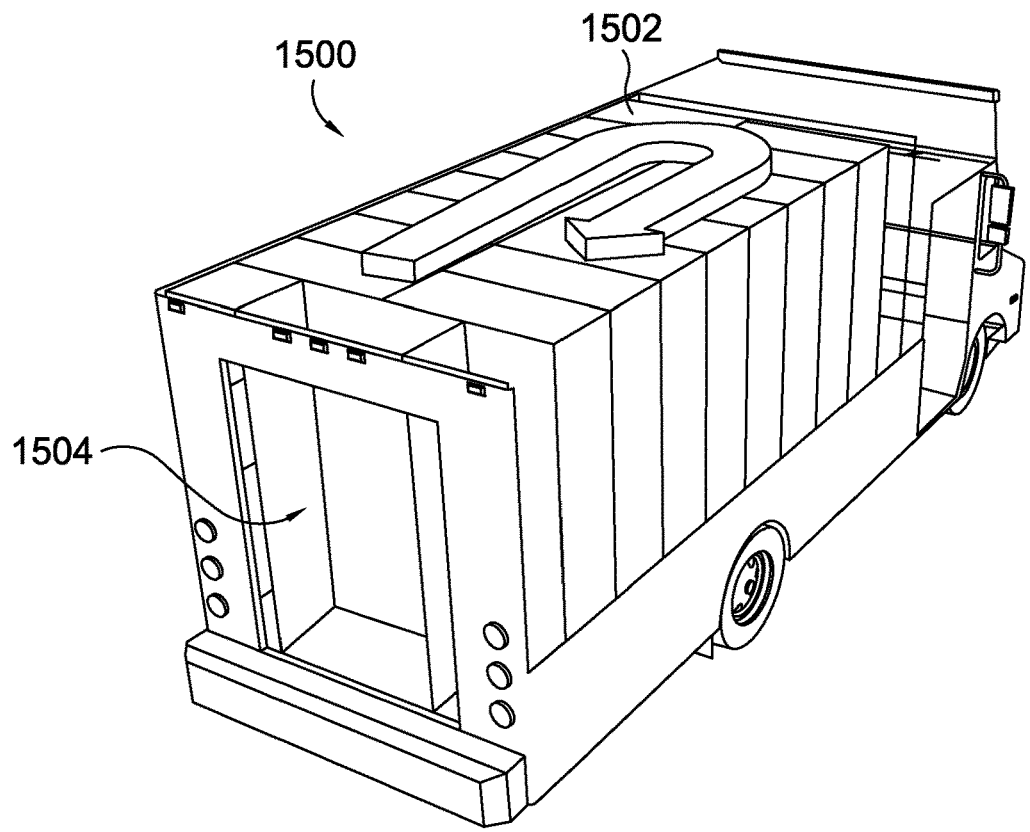
FIG. 15 depicts two perspective views of an example delivery vehicle illustrating the direction that shiftable storage structures located therein can be moved using a shifting mechanism that imparts movement to a bottom surface of the storage structures, in accordance with an aspect hereof.
Figure 15:
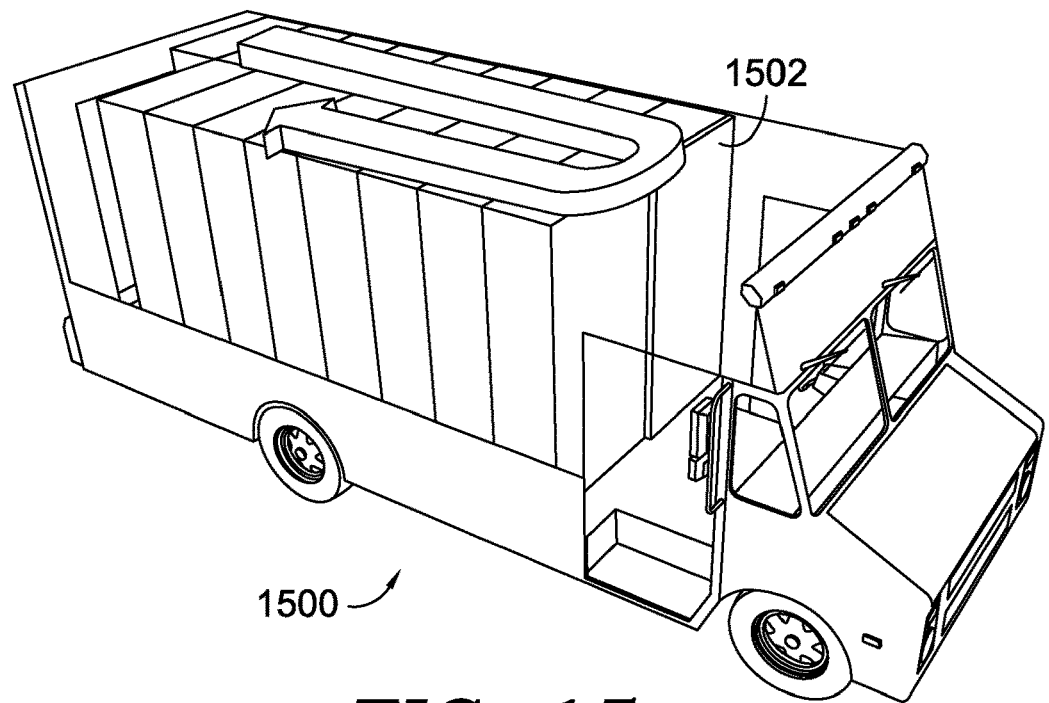

As shown in FIG. 15, the storage structures (e.g., storage carts with storage shelves for parcels) may be moved/shifted in a clockwise direction in the vehicle storage space until a storage structure with parcels to be staged for delivery is either at the bulkhead 1502 or rear door opening 1504 of the vehicle 1500, and therefore positioned so that the delivery vehicle driver can retrieve the parcels for delivery.

Figure 16:
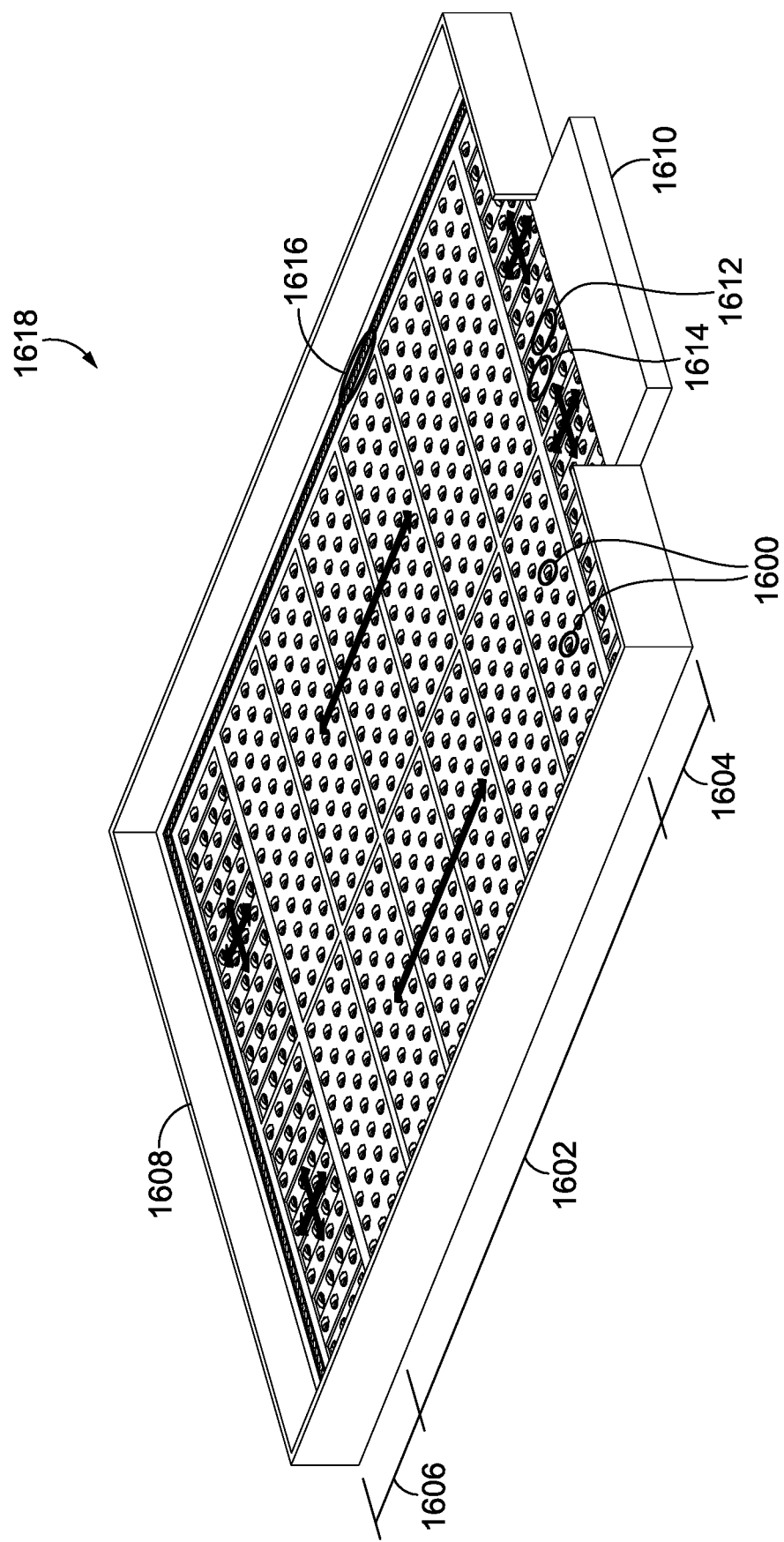
FIG. 16 depicts an example support surface of a shifting mechanism used to move storage structures in a storage space, the support surface comprising actuated rollers that are adapted to rotate in at least one direction to impart movement to storage structures supported thereon, in accordance with an aspect hereof.
Figure 17:
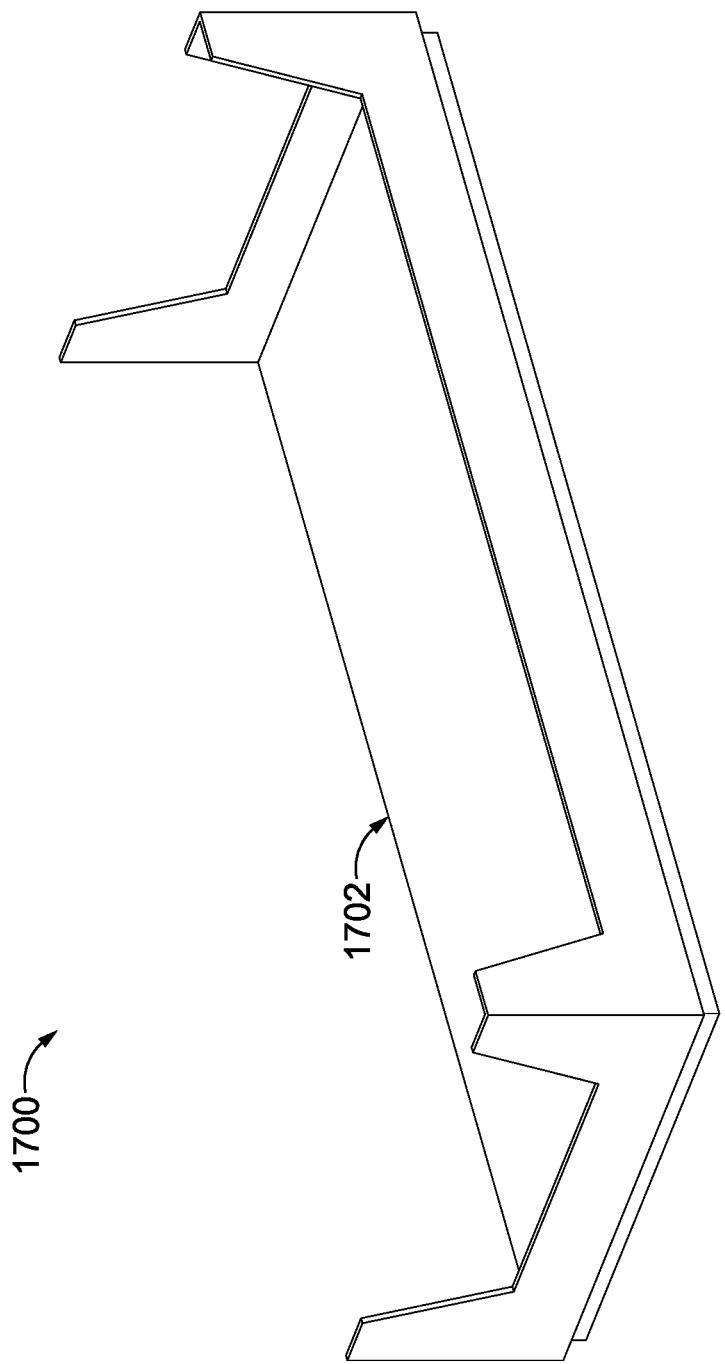
FIG. 17 depicts an example storage structure base that can be positioned on the support surface shown in FIG. 16, allowing a storage structure coupled to the base to be moved along the support surface, in accordance with an aspect hereof.
Figure 18:
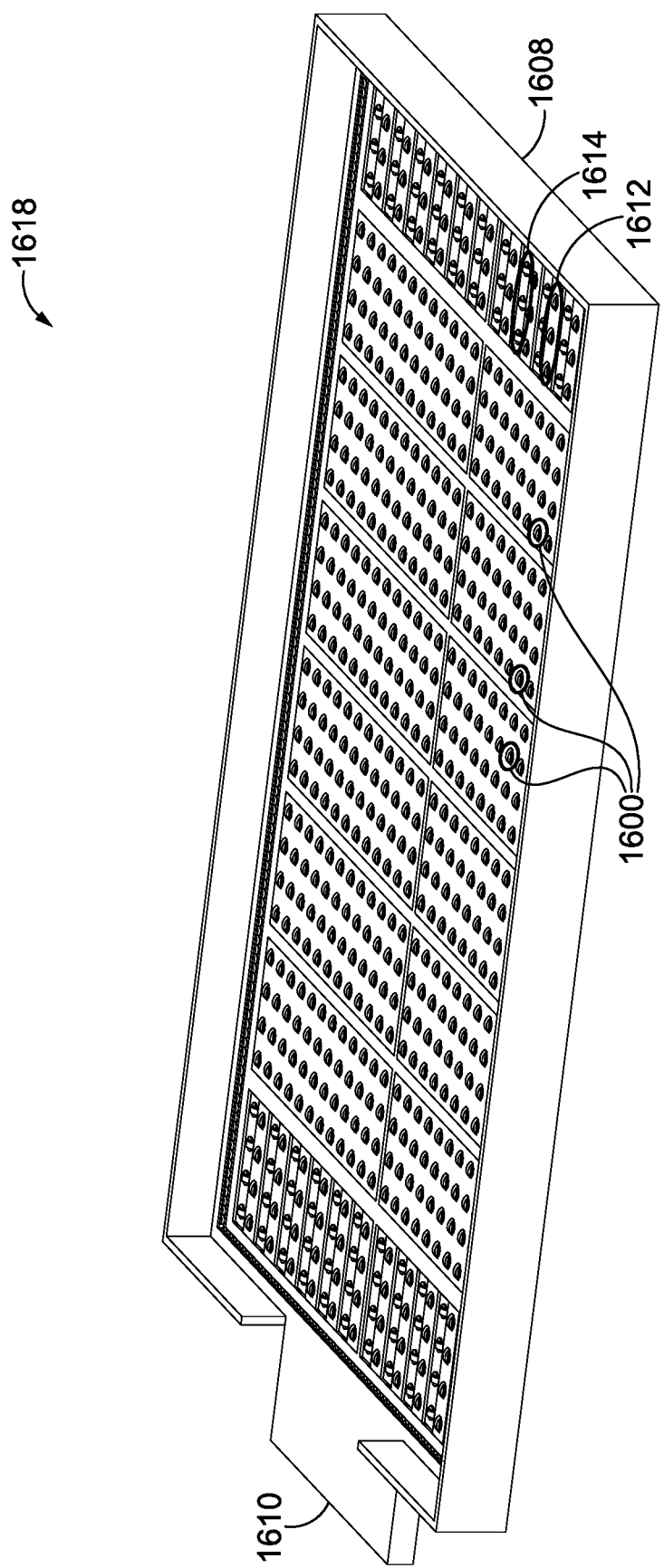
FIG. 18 depicts another perspective view of the example support surface shown in FIG. 16, in accordance with an aspect hereof.

FIGS. 16 and 18 depict perspective views of an example support surface 1618 located in a storage space of a delivery vehicle 100, in accordance with an aspect hereof. The support surface 1618 includes a shifting mechanism that comprises multiple powered rollers 1600 that are each driven by actuators (e.g., rotational actuators, which may be electric actuators) that impart rotational movement to each of the rollers in at least one direction. As shown in FIGS. 16-18, the rollers 1600 located in the middle portion 1602 of the support surface 1618 may move in two directions, either towards a first end 1608 of the storage space or toward a second end 1610 of the storage space. Other rollers, such as those found in areas 1604 and 1606, may be configured to rotate in a similar direction or in a direction perpendicular to the rollers in the middle portion 1602. Additionally, as seen in FIG. 16, the rollers in areas 1604 and 1606 may extend and retract depending on the direction of rotation that is desired, and by association, the direction of movement of the storage structures engaged by the rollers. In other words, the rollers 1600 in row 1612 are configured to move the storage structure either towards the first end 1608 or the second end 1610 of the storage space in the delivery vehicle 100 when raised and actuated, and the rollers 1600 in row 1614 are configured to move the storage structure towards a first side 1601 or a second side 1603 of the storage space within the delivery vehicle 100 when raised and actuated. In this sense, when the rollers 1600 in row 1614 are extended to move the storage structure, the rollers 1600 in row 1612 will be retracted to allow for such movement, since the rollers 1612 when raised and actuated would provide movement in a perpendicular direction. Similarly, when the rollers 1600 in row 1612 are extended to engage and move the storage structures on the support surface 1618, the rollers in row 1614 will be retracted to allow for such movement without interference. The rollers 1616 located along the edges of the support surface 1618 may be non-actuated, and instead may simply be free-spinning so that the storage structures can smoothly transition between different rollers areas of the support surface 1618 by rolling across the rollers 1616.

FIG. 17 depicts an example storage structure base 1700 that can be used to support a storage structure as it is moved across a support surface, such as the support surface 1618 shown in FIGS. 16 and 18, in accordance with an aspect hereof. The base 1700 is configured to be positioned on the support surface 1618 of the delivery vehicle 100 on top of the rollers 1600. Each base 1700 is configured to receive a storage structure, such as the storage structure 106 shown in FIG. 3, and can be moved by the rollers 1600 around a storage area of a support surface with actuated rollers as described with respect to FIGS. 16 and 18. Additionally, the base 1700 has a receiving side 1702 that is configured to receive a storage structure 106. The receiving side may be used for insertion and removal of a storage structure with the base 1702. The utilization of the flat moving base 1700 provides smooth movement that is not linked to the quality of the casters and is simple to install. It also provides for the ability to move the storage structures in multiple directions, including clockwise and counterclockwise. Further, the moving bases 1700 provides flexibility to utilize a variety of storage structures that can fit within the dimensions of the base and also provides flexibility to store larger parcels on larger sized moving bases.

Figure 19:
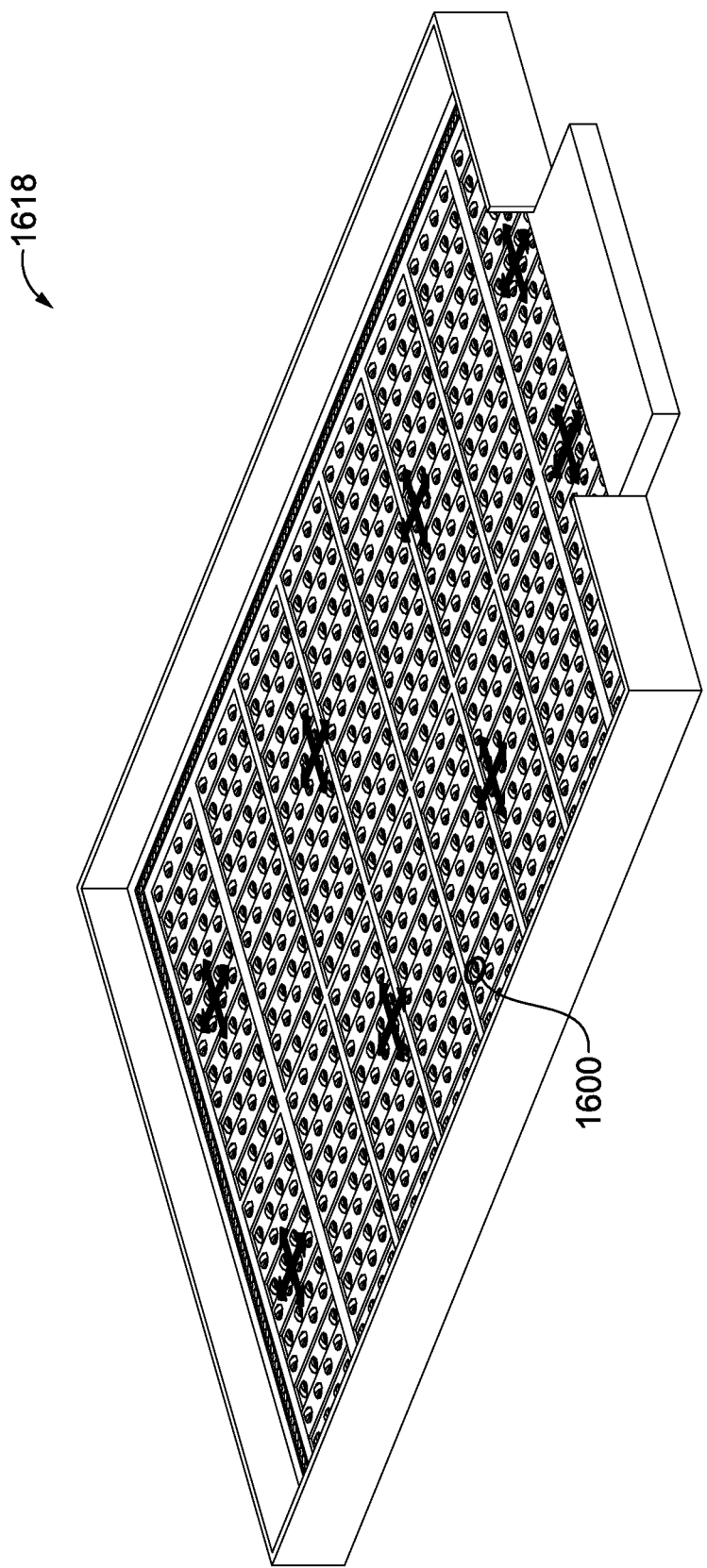
FIG. 19 depicts another example support surface with rollers that form part of a shifting mechanism used to move storage structures within a storage space, in accordance with an aspect hereof.

FIG. 19 shows an alternate embodiment of a support surface 1618 that includes a shifting mechanism comprising a plurality of actuated rollers 1600, in accordance with an aspect hereof. In the depicted embodiment, the rollers 1600 are coupled to actuators, with some rotating in a first direction and others rotating in a perpendicular direction. These multi-direction rollers are located across support surface 1620, as opposed to only being located in isolated areas as shown in FIGS. 16 and 18. This configuration allows the storage structures 106 to be shifted and positioned with greater mobility relative to the design shown in FIGS. 16 and 18. This provides more versatility for changing the order of the storage structures on the support surface 1620 by providing greater directional control. This is beneficial in circumstances where a delivery vehicle driver may change the delivery route, thereby changing the order of the original deliveries and requiring a significant re-ordering of the storage structures.

Figure 20:
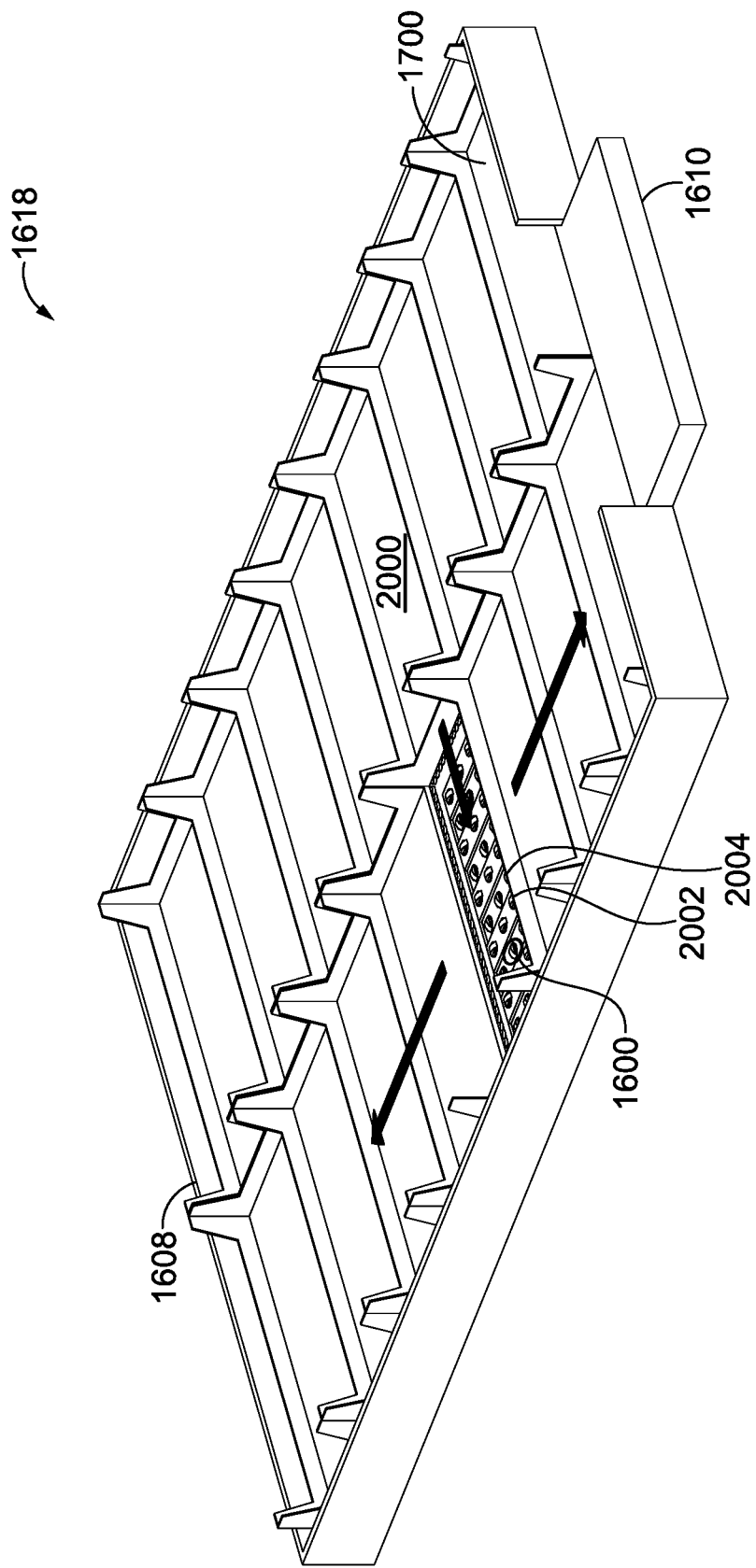
FIG. 20 depicts the support surface of FIG. 17 situated on the floor of a delivery vehicle with storage structure bases located thereon, showing directions of movement of the bases imparted by the rollers of the support surface, in accordance with an aspect hereof.

This embodiment is further illustrated in FIG. 20 which shows how the support surface 1618 comprising the plurality of rollers 1600 can move the bases 1700 (and any storage structures 106 resting thereon) both in a first direction and in a perpendicular second direction, depending on which rollers are raised and actuated as discussed with respect to FIGS. 16 and 18. As shown, the rollers 1600 can move a base 2000 in one direction using one set of rollers 2002 in order to open space on the support surface 1618. The rows of the rollers 2002 under base 2000 that rotate in this direction are in this circumstance in a raised position and rotationally actuated to move the moving base 2000 in this direction, while the rollers 2004 that rotate in a perpendicular direction are retracted to allow the base 2000 to move without interference from them. Additionally, as shown by the arrows in FIG. 20, the base 2000 may also move in another perpendicular direction towards the first end 1608 or second end 1610 of the delivery vehicle 100 when the rollers 2004 are raised and actuated, while the rollers 2002 are retracted.

Figure 21:
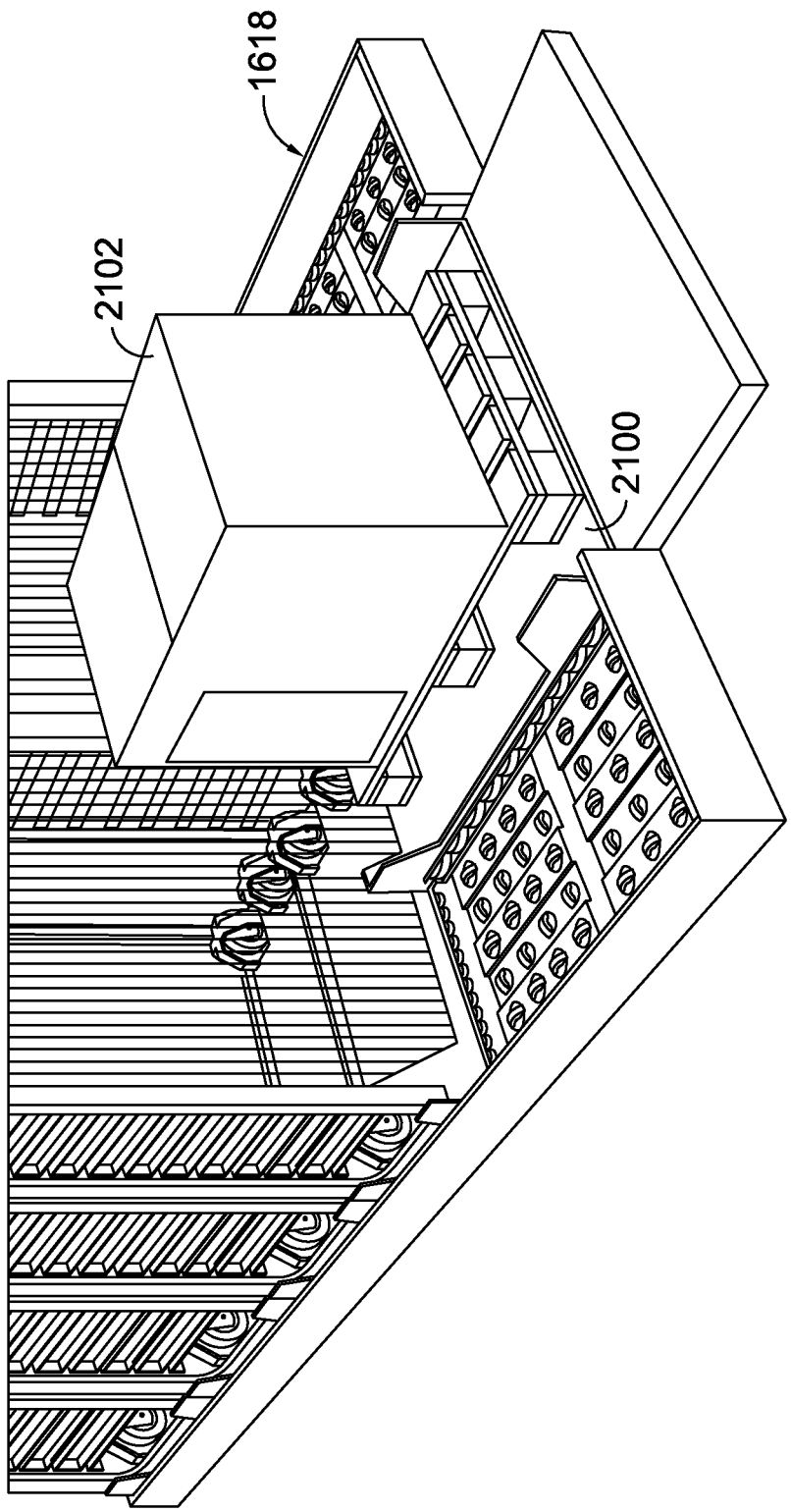
FIG. 21 depicts another example base designed to support parcels of a size larger than those shown on the storage structure of FIG. 5, in accordance with an aspect hereof.

FIG. 21 illustrates another embodiment in which a double deep base 2100 is placed upon the support surface 1618 of the delivery vehicle 100. The base 2100 is configured to store larger parcels compared to the base 1700, such as, for example, parcel 2102, and is movable in the same manner as the other bases described herein. This configuration provides further flexibility, allowing the delivery vehicle 100 and shifting mechanism therein to accommodate both parcels that are able to fit in the storage structures 106 and larger parcels that require different sized bases that are shifted about the support surface 1618.

Figure 22:
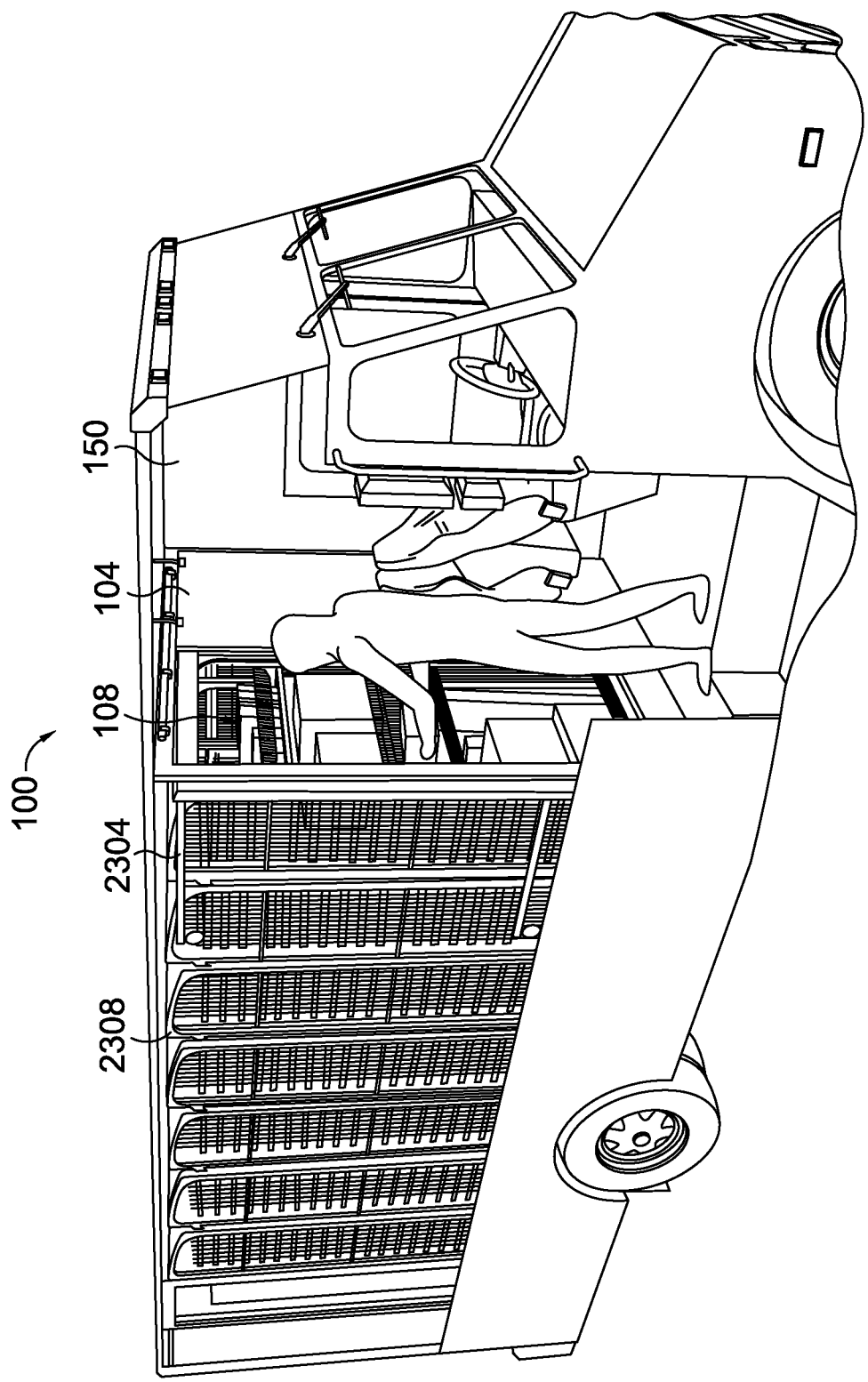
FIG. 22 depicts a partial side perspective view of an example delivery vehicle with storage structures containing parcels to be delivered presented to a delivery vehicle driver at a bulkhead of the delivery vehicle, in accordance with an aspect hereof.

FIG. 22 illustrates another embodiment of a storage structure shifting system that is adapted to shift storage structures 2308 (e.g., wheeled storage carts with configurable shelves as discussed herein) within a vehicle storage space for staging purposes, in accordance with an aspect hereof. In this example, the depicted storage structure 2308 is moved in a lateral direction across the storage space using a shifting mechanism 2304, such as a push/pull mechanism, shown in further detail in FIGS. 23A and 23B, that moves the storage structure 2308 across the storage space to a position in front of the bulkhead 104 of the delivery vehicle 100. This positioning allows a vehicle delivery vehicle driver to retrieve stored parcels from the storage structure 2308 at that position during a delivery process without having to enter the storage area and search for the parcels.

Figure 23A:
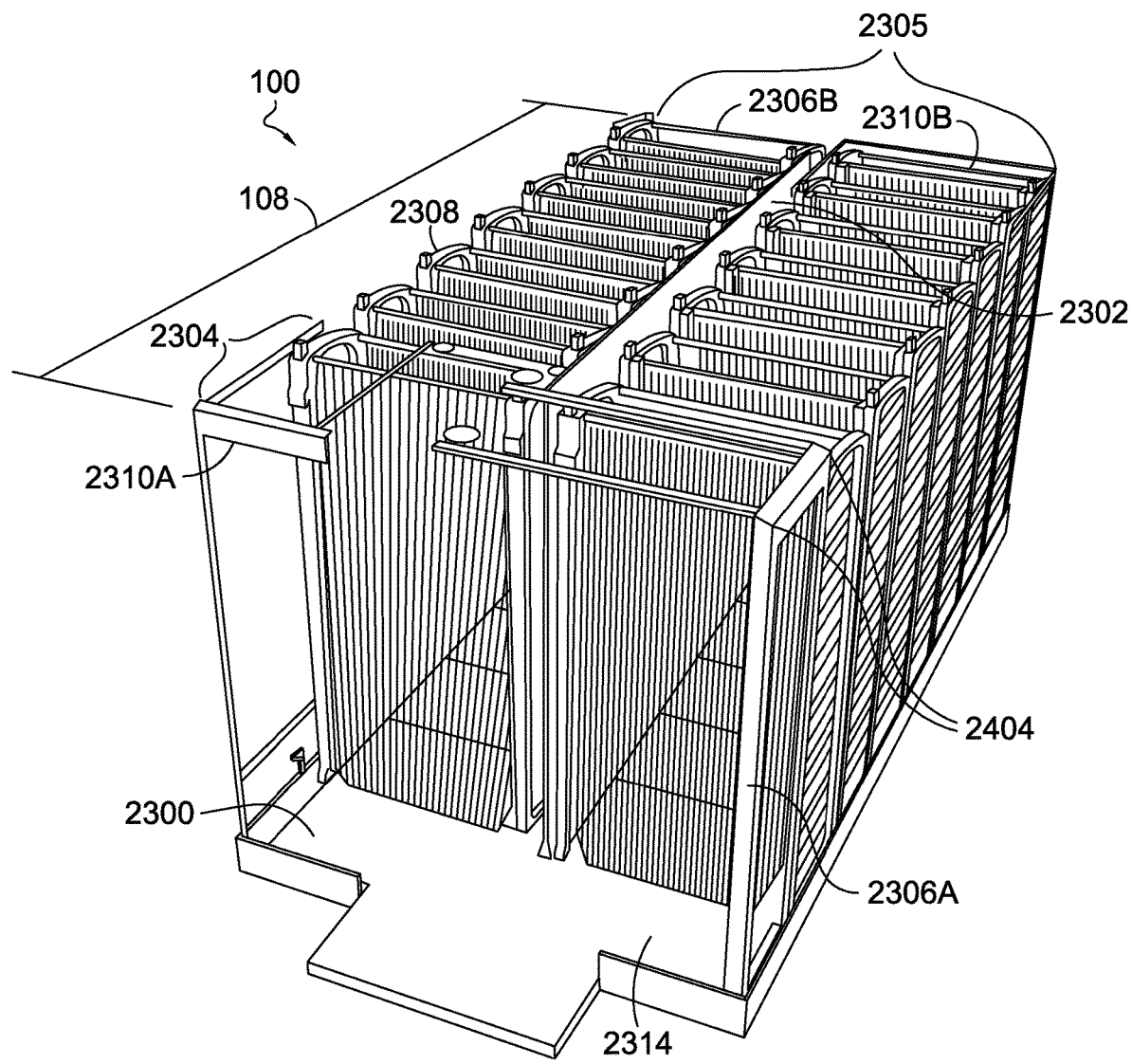
FIG. 23A depicts another embodiment of the system for shifting storage structures described herein, with a shifting mechanism adapted to impart push/pull actuation to the storage structures in the storage space, in accordance with an aspect hereof.
Figure 26:
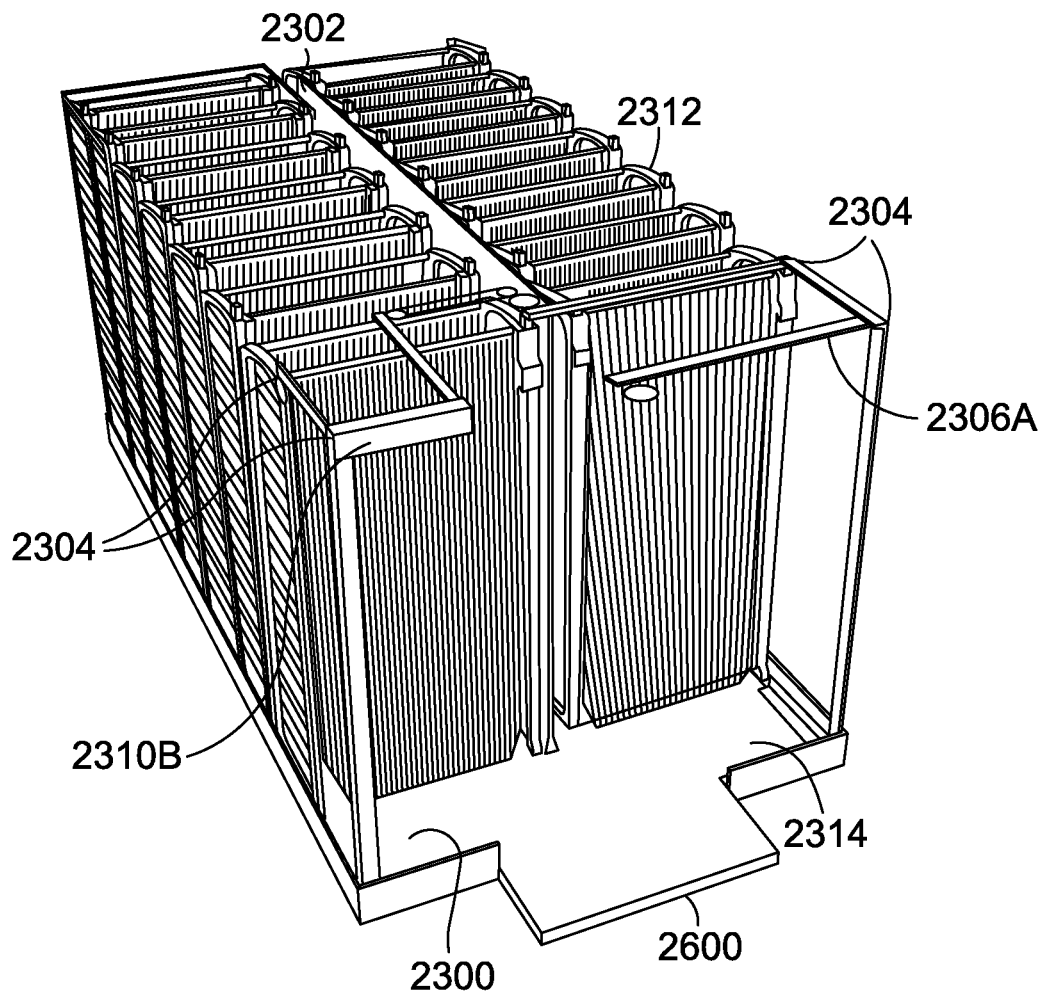
FIG. 26 depicts another partial, perspective view of the system comprising the shifting mechanism shown in FIG. 23, in accordance with an aspect hereof.

Looking now at FIG. 23A, in this embodiment, the support surface 2300 of the delivery vehicle 100 is an approximately flat base. Further, FIG. 23A includes shifting mechanism 2304 and shifting mechanism 2305 that are used in combination for pushing/pulling the storage structures 2308 within the storage space 108. The storage space 108 also includes a dividing panel 2302 that is located generally in the middle of the storage space 108. The dividing panel 2302 generally separates the storage space 108 into two areas of travel for the storage structures 2308, with one side for a first direction of travel and the other side for an opposite second direction of travel. The dividing panel 2302 also helps to maintain the proper direction of the shifted storage structures 2308. Additionally, as seen in FIG. 26, the delivery vehicle 100 may further include an elevating platform 2600 configured so that the storage structures 2308 can be loaded onto the delivery vehicle 100 and for lowering the storage structures 2308 off the delivery vehicle 100 as needed.

The shifting mechanism 2304 and the shifting mechanism 2305 each include several components that enable them to push/pull the storage structures 2308 within the storage space 108. This allows the storage structures 2308 to move in a controlled, clockwise fashion that allows different storage structures 2308 to be staged in the storage space 108 for parcel retrieval. For example, the shifting mechanism 2304 includes a first shifter assembly 2306A and a second shifter assembly 2310A that are used to shift the storage structures 2308 laterally and then longitudinally, respectively, within the storage space 108 at a first end of the storage space. The first and second shifters 2306A and 2310A may each include various engaging structures and actuators for facilitating such movement. The shifting mechanism 2305 includes a first shifter assembly 2306B and a second shifter assembly 2310B that are used to shift the storage structures 2308 similarly in lateral and longitudinal directions, respectively, but at the an opposite second end of the storage space 108. The first and second shifter assemblies 2306B, 2310B may also each include various engaging structures and actuators for facilitating movement of the storage structures 2308.

To effectuate the movement of the storage structures 2308 within the storage space 108, there needs to be at least one open floor space 2314 that is the size of the floor area of a storage structure 2308, so that the storage structures 2308 can be moved into new positions in the storage space 108 by the shifting mechanisms 2304 and 2305. This open space allows the shifting mechanisms 2304 and 2305 to push/pull the storage structures 2308 into the open area of the storage space. This effectuated movement allows a storage structure having the parcels for the next delivery to be advanced to a retrieval, or staging, area in the storage space (e.g., a bulkhead door or a rear door of the delivery vehicle).

Figure 23B:
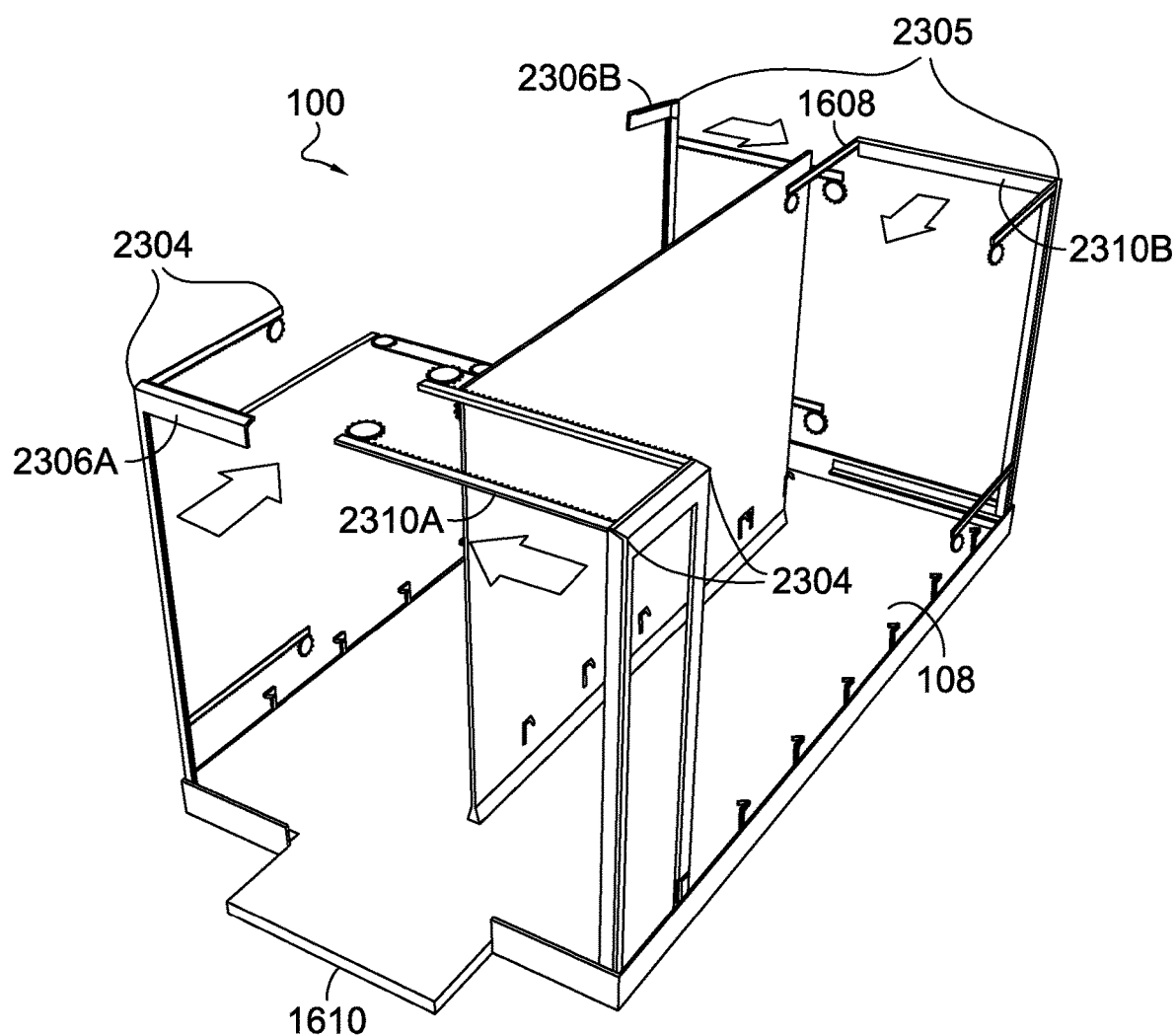
FIG. 23B depicts how the shifting mechanism of FIG. 23A pushes/pulls the storage structures in the storage space shown in FIG. 23A, in accordance with an aspect hereof.

The movement imparted by the shifting mechanisms 2304 and 2305 can further be seen in FIG. 23B, which depicts the shifting mechanisms 2304 and 2305 without the storage structures present, in accordance with an aspect hereof. As shown, the shifting mechanism 2304 at the second end 1610 moves the storage structure 2308 (shown in FIG. 23A) laterally across the storage space 108. More specifically, the first shifter 2306A engages a storage structure 2308 (not shown) and moves it laterally across the storage space 108. Then, the second shifter 2310A will engage the storage structure 2308 and move the storage structure 2308 longitudinally towards the first end 1608 of the vehicle 100. As shown, the shifting mechanisms 2304 and 2305 move the storage structures 2308 in clockwise fashion in the storage space shown in FIG. 23B. However, in alternate embodiments, they may rotate the support structures counterclockwise, and either direction is contemplated herein. Once the storage structure 2308 is advanced to the first end 1608 of the vehicle 100, the third shifter 2306B engages the storage structure 2308 and moves the storage structure 2308 laterally across the storage space 108. Once fully advanced, the fourth shifter 2310B engages and moves the storage structure 2308 longitudinally towards the second end 1610 of the vehicle 100. Each shifter 2306A, 2306B, 2310A, and 2310B may be powered by one or more actuators coupled to a control system. Further, it should be noted that the operation of any shifting mechanisms in any storage space (e.g., in a vehicle) may be controlled, monitored, and/or otherwise directed by a controller connected to a computing system. The computing system may be local to the storage space (e.g., located on a delivery vehicle) and/or may be located remotely (e.g., at an operation center), and may be connected to an interface with which a delivery driver is able to interact.

Figure 23C:
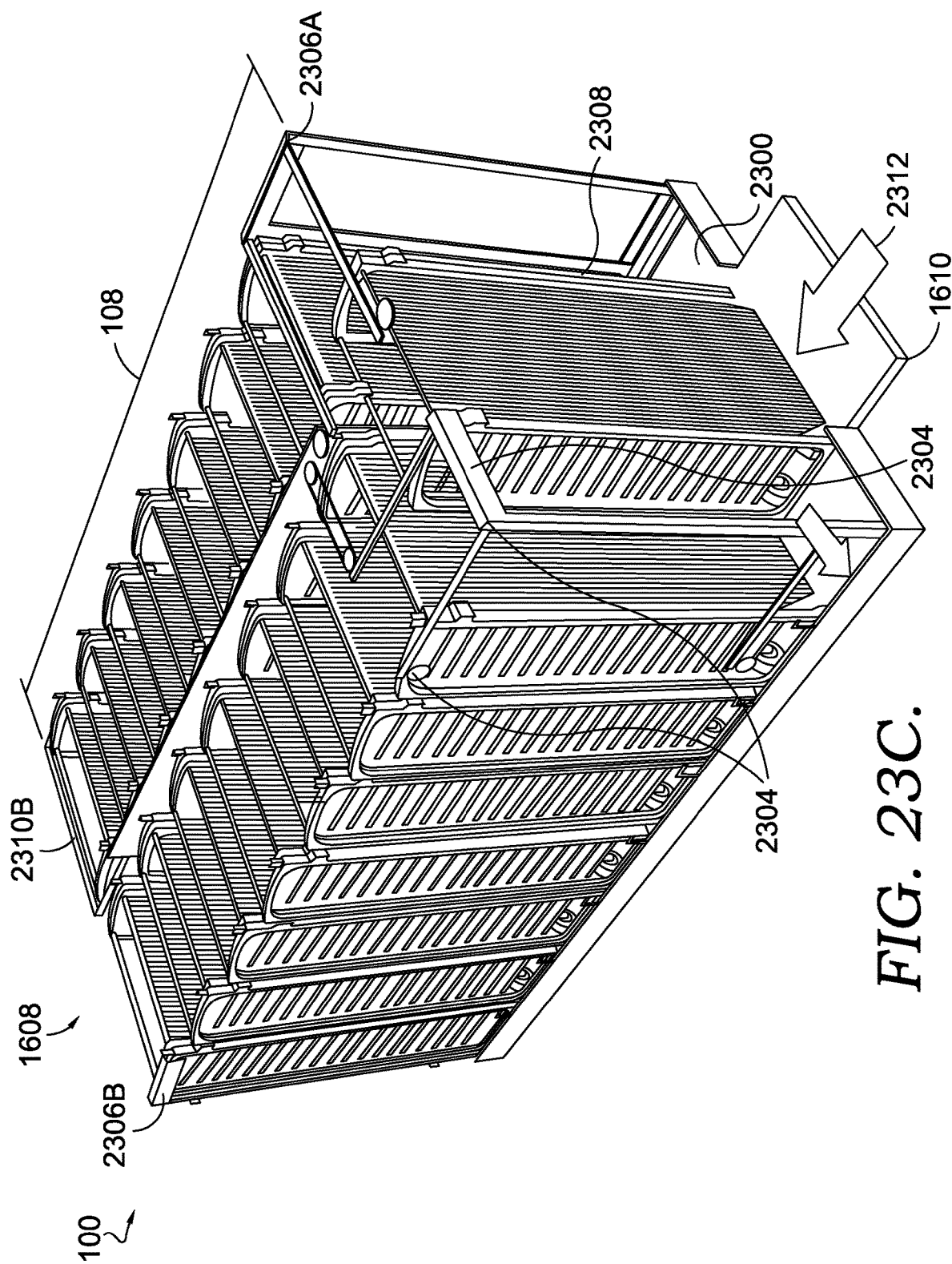
FIG. 23C depicts the loading of a storage structure into a storage space and the push/pull actuation provided by the shifting mechanism shown in FIGS. 23A and 23B, in accordance with an aspect hereof.

FIG. 23C depicts the loading of a storage structure 2308 into the storage space 108 of the example delivery vehicle 100 and the push/pull actuation of the shifting mechanisms 2304 and 2305 of FIG. 23A, in accordance with an aspect hereof. As shown by arrow 2312, the storage structure 2308 is loaded onto the support surface 2300, via the elevating platform 2600, at the second end 1610 of the storage space 108. Once loaded, the first shifter 2306A of the shifting mechanism 2304 will move storage structure 2308 laterally so that the storage structure 2308 is in position for the second shifter 2310A to move the storage structure 2308 longitudinally from the second end 1610 toward the first end 1608 of the vehicle 100.

Figure 23D:
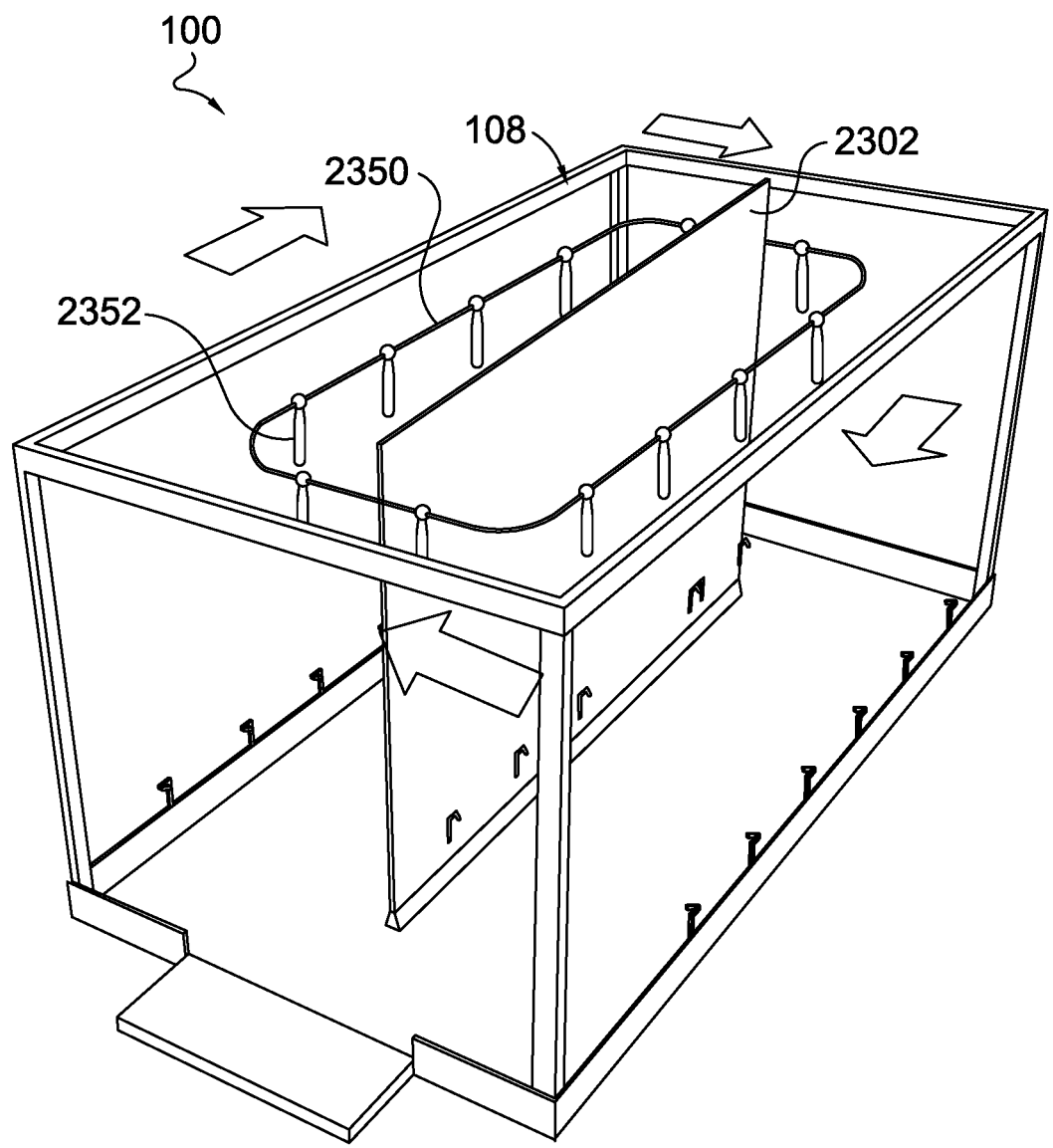
FIG. 23D depicts another embodiment of the system for shifting storage structures described herein, showing a storage space with a shifting mechanism located in an upper region of the storage space, the shifting mechanism adapted to move the storage structures from above, in accordance with an aspect hereof.

FIG. 23D depicts another embodiment of the system for shifting storage structures and parcels located thereon described herein, with a shifting mechanism 2350 located proximate a top region of the storage space 108 and adapted to move the storage structures 2308 (not shown) from above, in accordance with an aspect hereof. In this embodiment, the shifting mechanism 2350 is configured around the dividing panel 2302. It is contemplated that the shifting mechanism 2350 may or may not be secured to the dividing panel 2302. As shown, the shifting mechanism 2350 is not secured to the dividing panel 2302 and instead is secured to the vehicle 100 adjacent the top surface (not shown). Additionally, it is contemplated that in some embodiments, there may be no dividing panel 2302. The shifting mechanism 2350 comprises multiple engaging structures 2352 that may be used to engage with and impart movement to the storage structures 2308. The shifting mechanism 2350 may be powered by one or more actuators and/or may include at least one track along which the engaging structures 2352 move. Further, the shifting mechanism 2350 is shown as facilitating movement of the storage structures 2308 clockwise. However, in other embodiments, the shifting mechanism 2350 may facilitate movement of the storage structures 2308 counterclockwise, and either direction is contemplated.

Figure 23E:
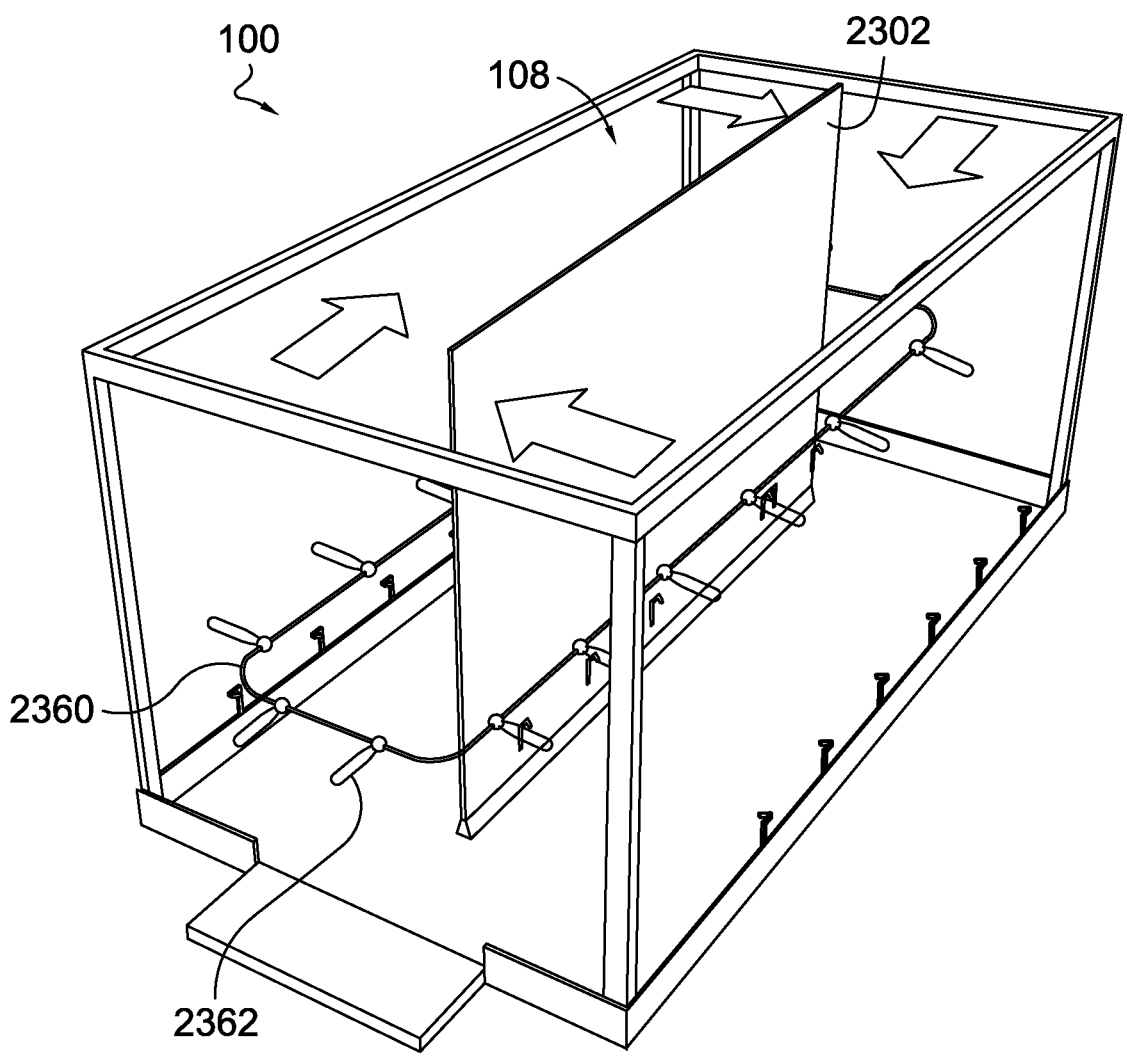
FIG. 23E depicts another embodiment of the system for shifting storage structures described herein, with a shifting mechanism that is located in a center area of the storage space, the shifting mechanism adapted to move the storage structures from the middle region of the storage space, in accordance with an aspect hereof.

In addition to facilitating movement of the storage structures 2308 from the top, sides, and bottom, additional embodiments may comprise a shifting mechanism 2360 that is located in a center of the storage space 108 and adapted to move the storage structures 2308 (not shown) from a middle region, as shown in FIG. 23E. Similar to the embodiment of FIG. 23D, the shifting mechanism 2360 is configured around the dividing panel 2302 and may or may not be secured to the dividing panel 2302. In FIG. 23E, the shifting mechanism 2360 is not secured to the dividing panel 2302 and instead is secured/anchored to the vehicle 100 in a center region of the storage space 108 (the attachments are not shown in FIG. 23E). Additionally, like FIG. 23D, it is contemplated that in some embodiments, there may be no dividing panel 2302. The shifting mechanism 2360 further includes engaging structures 2362 that may engage with and impart movement to the storage structures 2308. The shifting mechanism 2360 may be powered by one or more actuators and/or may include at least one track along which the engaging structures 2362 travel. Further, the shifting mechanism 2360 is shown as facilitating movement of the storage structures 2308 clockwise. However, in other embodiments, the shifting mechanism 2360 may facilitate movement of the storage structures 2308 counterclockwise, and both directions are contemplated.

Figure 24:
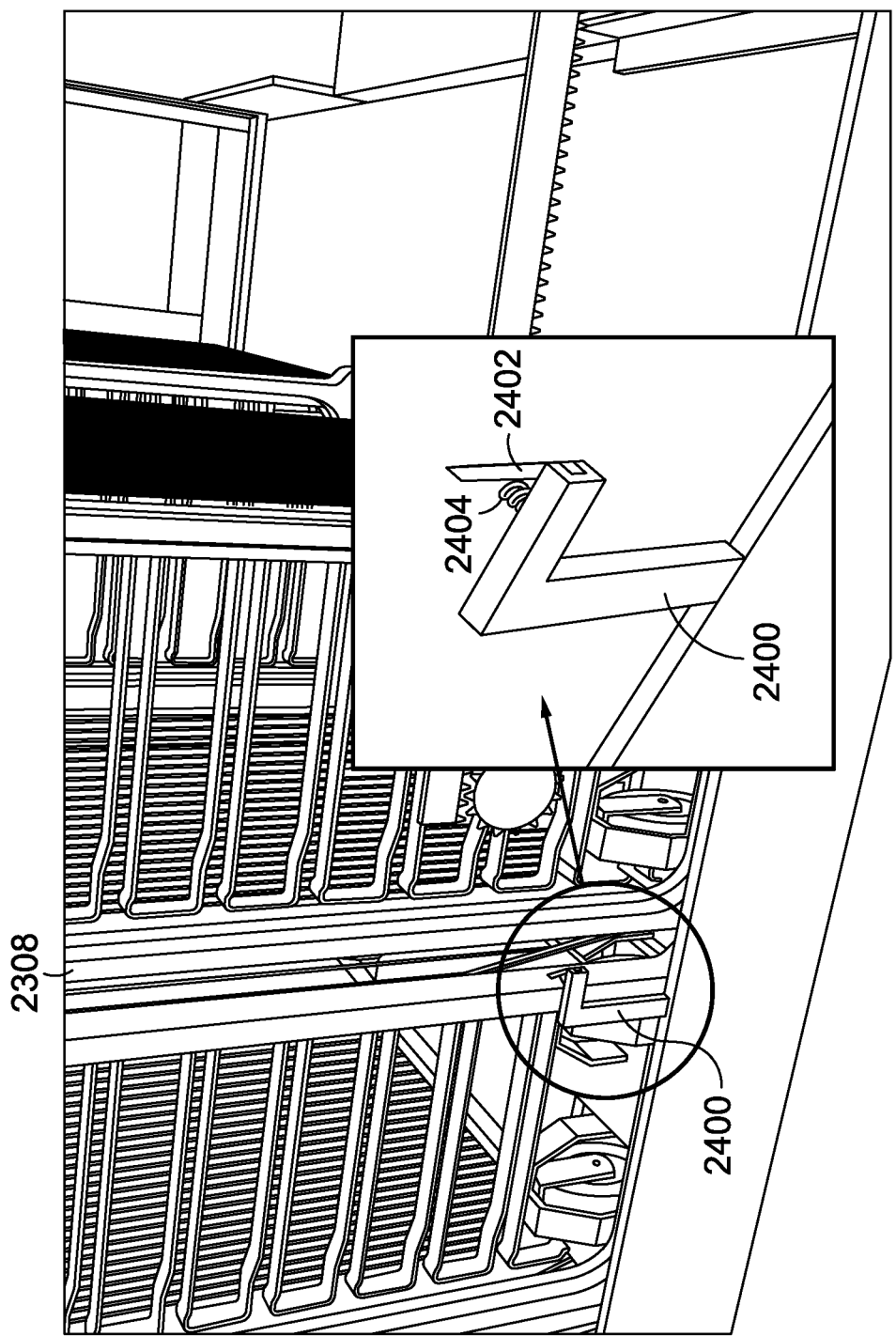
FIG. 24 depicts a retainer that is adapted to retain the storage structure of FIG. 23 in position after the storage structure is moved past a one-way mechanism that forms part of the retainer, in accordance with an aspect hereof.

FIG. 24 depicts a retainer mechanism 2400 that is used to restrict movement of a storage structure 2308 in a particular direction during the shifting process. In this respect, once a storage structure 2308 passes through the retainer mechanism 2400, it is restricted from reversing back towards a shifting mechanism 2304 and 2305 (not shown) that has just advanced it. The retainer mechanism 2400 includes a retainer arm 2402 (e.g., a hinged bar as shown in FIG. 24) and a biasing mechanism 2404 (e.g., a spring as shown in FIG. 24). As the storage structure 2308 is advanced through the retainer mechanism 2400, the arm 2402 is depressed against the force of the biasing mechanism 2404 and the storage structure 2308 is advanced. After the storage structure 2308 advances past the arm 2402, the arm 2402 is biased back forward by the biasing mechanism 2404. This then blocks the storage structure 2308 from traveling in the opposite direction back towards the shifting mechanism that has just advanced it. In a sense, the retainer mechanism 2400 acts as a one-way clutch, supporting a proper direction of movement.

Figure 25:
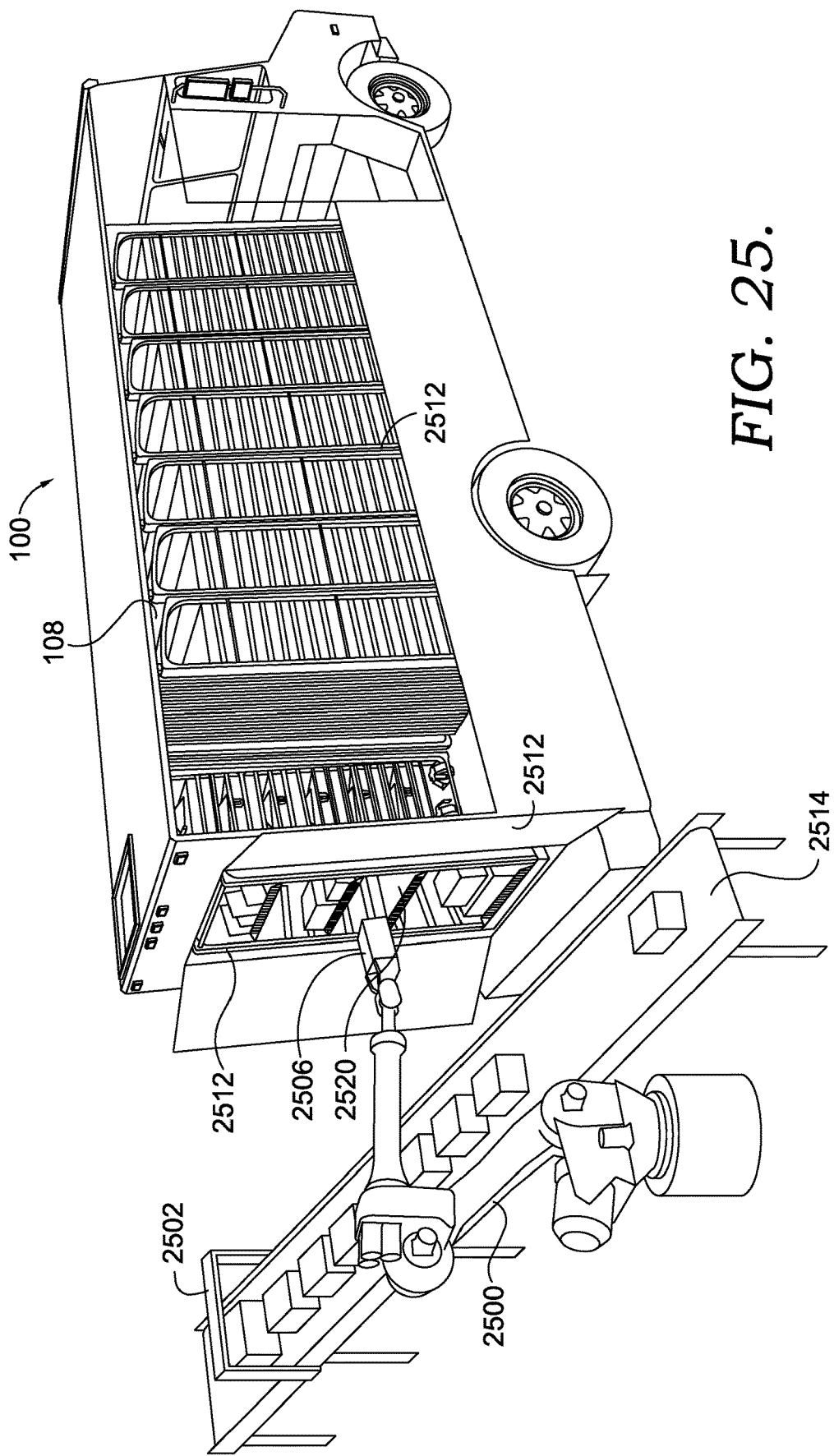
FIG. 25 depicts a delivery vehicle with a system for shifting parcels integrated therein, the vehicle positioned in a loading area where a robotic apparatus loads parcels into storage structures located in the vehicle, in accordance with an aspect hereof.

FIG. 25 depicts the delivery vehicle 100 having the shifting system discussed herein, with the delivery vehicle 100 shown while parcels are being loaded onto storage structures 2512 located inside the storage space 108. The parcels are loaded using a computer-controlled robot that lifts and places each parcel at a location on the storage structures 2512. Further, each parcel is scanned so that its unique identifying information is associated with its position within the storage structures 2512. This tracked positioning allows the location of the parcel to be known so that the parcel shifting system can appropriately stage the parcel for retrieval at its delivery location using the shifting mechanisms and route guidance systems described herein.

For description purposes, a parcel may actually be a group of parcels, a package or group of packages, scrap metal banded together, a vehicle part, a box, a crate, a drum, a box strapped to a pallet, and/or any other item or object. A parcel is not limited to a single package or enclosure of any particular type. In one embodiment, each parcel may include an item/shipment identifier, such as a barcode, a MaxiCode, an electronic representation, and/or text (e.g., alphanumeric text). The unique parcel/shipment identifier (e.g., "123456789") may be used by the logistics carrier to identify and track the parcel as it moves through the carrier's transportation network. Such parcel/shipment identifiers can be affixed to items by, for example, using a sticker (e.g., label) with the unique parcel/shipment identifier printed thereon (in human and/or machine readable form) or using an RFID tag with the unique parcel/shipment identifier stored therein. In addition to the parcel/shipment identifier, the label or RFID tag may also include other shipping indicia such as a destination address which may also be captured. Generally described, parcels are received at a receiving station where identification data may be captured for each parcel and handling instructions may be generated. In some embodiments, a label having indicia associated with the parcel may be generated and affixed to the item. The parcels may then be conveyed to a loading station or conveyer belt where the parcels are loaded onto an assigned storage shelf within an assigned storage structure based at least in part on the handling instructions.

In the embodiment shown in FIG. 25, the shelving unit loader 2500 (e.g., the robot as depicted in FIG. 25) automatically loads parcels from a conveyer belt 2514 onto storage structures 2512 located at the rear door opening 112 of the delivery vehicle 100. While the shelving unit loader 2500 is depicted as a robot in FIG. 25, it is contemplated that a human loader may also load parcels onto the storage structures 2512. When the parcels are loaded by a human, the storage structure shifting mechanism may cycle the storage structures to present either an assigned storage structure to the human loader for loading of the parcels or may present any storage structure with available space for the parcels. The location of a parcel that is stored on a particular storage structure may then be determined, stored, and/or communicated as described elsewhere herein.

As shown, a scanner 2502 is used to scan each barcode label on each parcel as the parcel advance down the conveyor belt 2514 towards the shelving unit loader 2500. The shelving unit loader 2500 retrieves a parcel, such as parcel 2506, from the convey belt 2514 and loads the parcel 2506 onto the assigned storage shelf 2520 on the assigned storage structure 2512. The storage structure shifting system in the vehicle 100 will dynamically move the storage structures within the storage area 108 throughout the loading process to provide open shelves or loading assigned parcels. Once the assigned parcels are loaded onto the corresponding storage structure 2512 and shelf thereof, one of the shifting mechanisms described herein can then advance the loaded storage structure 2512 within the vehicle 100 so that the next empty storage structure 2512 may be positioned for loading by the shelving unit loader 2500.

Alternatively, the storage structures 2512 may be loaded outside of the delivery vehicle 100 with parcels and then placed into the delivery vehicle 100 in such a way that each parcel location is tracked (e.g., by storage structure and/or by shelf). The parcels may be loaded onto the storage structures manually by loading personnel or automatically by a shelving unit loader 2500 as shown in FIG. 25, or by a combination of both. This external loading process further increases efficiency due to the shelving unit loader 2500 or manual loader no longer needing to wait for the return of a delivery vehicle to prepare a next group of parcels for delivery. Instead, the parcels can be loaded onto the appropriate storage structures prior to the vehicle's arrival at a loading facility. Since the packages would be loaded onto the assigned storage structures, minimal time would be spent loading the structures onto the delivery vehicle. This would result in further improvement of the efficiency of the delivery process.

Figure 27:
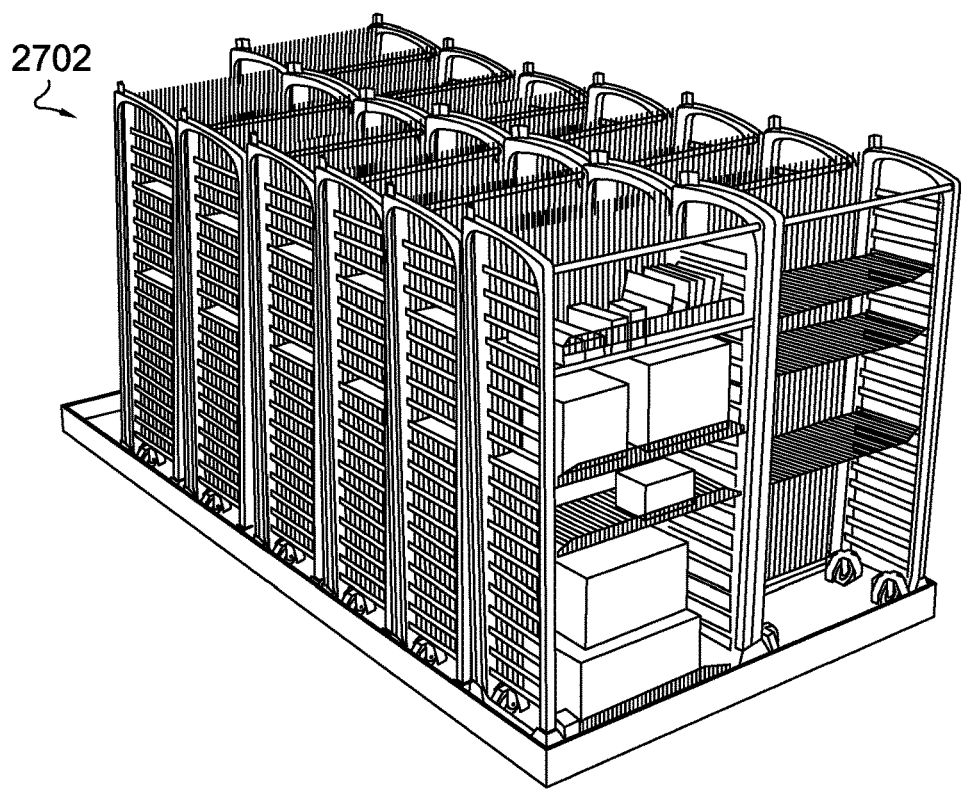
FIG. 27 depicts both the storage structure system comprising the movable bases and the storage structure system comprising the push/pull mechanism, in accordance with aspects herein.
Figure 27:
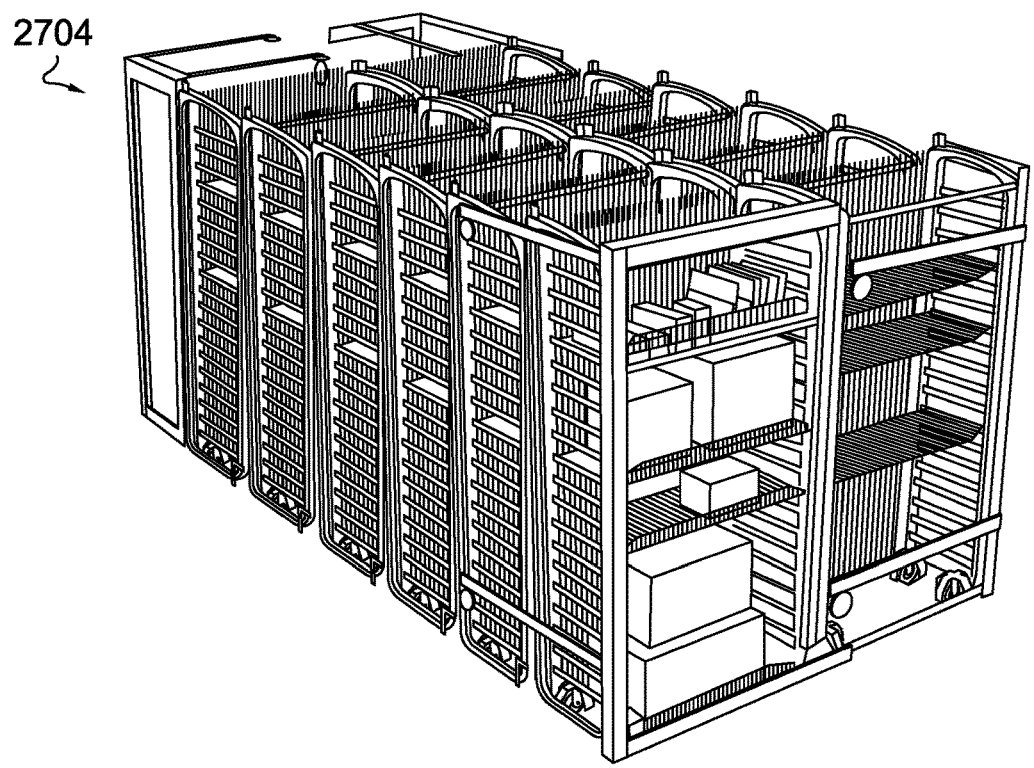

FIG. 27 depicts the storage structure shifting system described herein in different forms. The first form 2702 shown in the top image moves the storage structures from below, or in other words, engages and advances them from a support surface as described with respect to FIGS. 16 and 18. The second form 2704 shown in the bottom image engages and moves the storage structures from above using the push-pull shifting mechanisms described with respect to FIG. 23. Each system may include various components, linkages, actuators, and control systems to facilitate the operation of the shifting components, and the guiding of the storage structures. For example, the shifting system shown in the below image may utilize gear and track based actuators, or linear actuators that are electric, hydraulic, or otherwise mechanically driven. The shifting system shown in the above image using the powered rollers may be electrically driven and controlled.

Many modifications and other embodiments of the disclosed subject matter will become apparent to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

It should be emphasized that the above-described embodiments of the present invention, particularly any "preferred embodiments" or "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

In concluding the detailed description, it should be noted that it will be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

What is claimed is:

1. A system for adjusting a position of one or more storage structures located within a storage space, the system comprising:

a support surface;

a shifting mechanism comprising a plurality of rollers; and a plurality of storage structures movable along the support surface using the shifting mechanism, wherein each of the storage structures is adapted to engage and support one or more shelves, the plurality of storage structures each including a plurality of removable shelves upon which one or more parcels are placed for delivery, and wherein at least one of the plurality of removable shelves comprises a cantilevered shelf that is configured to secure a battery pack for an unmanned aerial vehicle (UAV) and a parcel attached to the battery pack.

2. The system of claim 1, wherein the plurality of rollers is powered by actuators to provide rotational movement.

3. The system of claim 2, wherein each storage structure includes a base with a bottom surface, and wherein the plurality of storage structures is supported on the plurality of rollers by their respective bases.

4. The system of claim 1, wherein the shifting mechanism comprises a mechanical shifting assembly adapted to engage and move one of the plurality of storage structures in at least one direction.

5. The system of claim 4, wherein the mechanical shifting assembly comprises at least one actuator, at least one engaging component adapted to engage with the one of the plurality of storage structures, and a one-way retaining mechanism.

6. The system of claim 1, wherein the plurality of storage structures is dynamically rearranged within the storage space based on a delivery route of a delivery vehicle in which the storage space is located, wherein the delivery route of the delivery vehicle is based on delivery data received from a computer system associated with the system for adjusting the position of one or more storage structures located within the storage space.

7. The system of claim 6, wherein the plurality of storage structures are dynamically moved, based on the delivery data received from the computer system associated with the system for adjusting the position of one or more storage structures located within the storage space, prior to each destination on the delivery route being reached so that at least one parcel corresponding to the destination is positioned at one or more of a rear entry of the delivery vehicle for retrieval or at a bulkhead of the delivery vehicle for retrieval.

8. The system of claim 1, wherein a plurality of parcels is loaded onto the plurality of storage structures prior to the plurality of storage structures being loaded onto a delivery vehicle, each of the plurality of parcels comprising a label comprising a unique identifying code that is scanned prior to loading and dynamically updated throughout a delivery process to reflect a location of each parcel in the storage space.

9. The system of claim 1, further comprising a retainer that restricts the plurality of storage structures from moving in at least one direction in the storage space.

* * * * *